(12) United States Patent
Anzai

(10) Patent No.: US 11,860,361 B2
(45) Date of Patent: Jan. 2, 2024

(54) REFLECTION FILM, WINDSHIELD GLASS, AND HEAD-UP DISPLAY SYSTEM

(71) Applicant: FUJIFILM Corporation, Tokyo (JP)

(72) Inventor: Akihiro Anzai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/956,512

(22) Filed: Sep. 29, 2022

(65) Prior Publication Data

US 2023/0028048 A1    Jan. 26, 2023

Related U.S. Application Data

(63) Continuation of application No. PCT/JP2021/012863, filed on Mar. 26, 2021.

(30) Foreign Application Priority Data

Mar. 30, 2020 (JP) .................................. 2020-059674

(51) Int. Cl.
G09G 5/00 (2006.01)
G02B 27/01 (2006.01)
(Continued)

(52) U.S. Cl.
CPC .......... G02B 27/0101 (2013.01); B60K 35/00 (2013.01); G02B 5/3016 (2013.01); G02B 2027/011 (2013.01)

(58) Field of Classification Search
CPC ...... G02B 5/30; G02B 5/3016; G02B 5/3066; G02B 27/0101; G02B 2027/011;
(Continued)

(56) References Cited

U.S. PATENT DOCUMENTS

2017/0192231 A1    7/2017  Ichihashi et al.
2019/0030856 A1    1/2019  Hayasaki et al.
(Continued)

FOREIGN PATENT DOCUMENTS

JP    2004020943 A   *  1/2004
JP    2019-12211 A      1/2019
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2021/012863, dated Oct. 13, 2022, with an English translation.

(Continued)

*Primary Examiner* — Joe H Cheng
(74) *Attorney, Agent, or Firm* — Birch, Stewart, Kolasch & Birch, LLP

(57) ABSTRACT

There are provided a reflection film, a windshield glass, and a head-up display system capable of suppressing formation of double images of a display image. The reflection film has a linearly polarized light reflection layer in which optically anisotropic layers and isotropic layers are laminated and a polarization converting layer, and the polarization converting layer satisfies any of conditions below.
(A) The polarization converting layer is a retardation layer in which the front retardation is 30 nm to 200 nm and the angle between a slow axis direction and a direction of the transmission axis of the linearly polarized light reflection layer is 35° or less.
(B) The polarization converting layer is a layer in which a helical alignment structure of a liquid crystal compound is fixed, and the number of pitches x in the helical alignment (Continued)

structure and the film thickness y (unit μm) of the polarization converting layer satisfy all relational expressions below.

$$0.1 \leq x \leq 1.0 \quad \text{(i)}$$

$$0.5 \leq y \leq 3.0 \quad \text{(ii)}$$

$$3000 \leq (1560 \times y)/x \leq 50000 \quad \text{(iii)}$$

10 Claims, 2 Drawing Sheets

(51) Int. Cl.
*B60K 35/00* (2006.01)
*G02B 5/30* (2006.01)

(58) Field of Classification Search
CPC ........ B60K 2370/1529; B60K 2370/23; B60K 2370/344; B60K 2370/39; B60K 2370/785
See application file for complete search history.

(56) References Cited

U.S. PATENT DOCUMENTS

| | | | |
|---|---|---|---|
| 2020/0326539 A1* | 10/2020 | Ando | G02B 5/3016 |
| 2021/0263314 A1* | 8/2021 | Anzai | G02B 5/3016 |
| 2021/0294099 A1 | 9/2021 | Anzai et al. | |
| 2022/0221718 A1* | 7/2022 | Anzai | G02B 5/3016 |
| 2023/0035433 A1* | 2/2023 | Anzai | G02B 5/3066 |

FOREIGN PATENT DOCUMENTS

| | | |
|---|---|---|
| JP | 2020-160207 A | 10/2020 |
| WO | WO 2016/052367 A1 | 4/2016 |
| WO | WO 2017/175852 A1 | 10/2017 |
| WO | WO 2020/122023 A1 | 6/2020 |

OTHER PUBLICATIONS

International Search Report (Form PCT/ISA/210) for International Application No. PCT/JP2021/012863, dated May 25, 2021, with an English translation.

* cited by examiner

REFLECTION FILM, WINDSHIELD GLASS, AND HEAD-UP DISPLAY SYSTEM

CROSS-REFERENCE TO RELATED APPLICATIONS

This application is a Continuation of PCT International Application No. PCT/JP2021/012863 filed on Mar. 26, 2021, which claims priority under 35 U.S.C. § 119(a) to Japanese Patent Application No. 2020-059674 filed on Mar. 30, 2020. The above application is hereby expressly incorporated by reference, in its entirety, into the present application.

BACKGROUND OF THE INVENTION

1. Field of the Invention

The present invention relates to a reflection film that can be used as a combiner of a head-up display system, and to a windshield glass and a head-up display system having the reflection film.

2. Description of the Related Art

At present, head-up displays or head-up display systems are known that project a screen image on a windshield glass of a vehicle or the like and provide various information such as a map, a driving speed, and a vehicle state to a driver or the like.

In such a head-up display system, a driver or the like observes a virtual image of a screen image projected on the windshield glass and including the above-mentioned various information. The imaging position of the virtual image is located ahead of the windshield glass outside the vehicle. The imaging position of the virtual image is normally located 1000 mm or more ahead of the windshield glass and on the outer side of the windshield glass. Thus, the driver can obtain the above-mentioned various information without widely moving the line of sight while seeing the outside front view. Therefore, when the head-up display system is used, it is expected that driving is more safely performed while various information is obtained.

The head-up display system can be constituted by forming a half mirror film (reflection film) on the windshield glass. Various half mirror films that can be used for head-up display systems have been proposed.

JP2019-012211A describes a projection image-displaying half mirror which includes a selectively reflecting layer that wavelength-selectively reflects light and in which the selective reflection center wavelength of a selectively reflecting layer having a selective reflection center wavelength at the shortest wavelength in the visible light wavelength range is 650 to 780 nm.

The projection image-displaying half mirror described in JP2019-012211A is incorporated into, for example, a windshield glass to constitute a head-up display system. The windshield glass (combiner) constituting the head-up display system is required to have high visible light transmittance and to allow a driver to visually recognize a screen image even when the driver wears polarized sunglasses.

Light reflected from, for example, a hood and puddles on a road surface, which interferes with driving, is mainly s-polarized light. To address this, polarized sunglasses have a function of screening out s-polarized light. Therefore, glare caused by light reflected from the hood of cars in the opposite lane or puddles, which interferes with driving, is made invisible by wearing polarized sunglasses.

Herein, the projection image-displaying half mirror described in JP2019-012211A reflects p-polarized light in order to display a projection image using p-polarized light. Therefore, even when polarized sunglasses that screen out s-polarized light are worn, the screen image of the head-up display system can be visually recognized.

SUMMARY OF THE INVENTION

Herein, the projection image-displaying half mirror described in JP2019-012211A has a linearly polarized light reflection layer obtained by laminating thin films having different refractive index anisotropies as selectively reflecting layers that reflect light having a selective reflection wavelength.

In a head-up display that reflects p-polarized light, when a reflection film having a linearly polarized light reflection layer is incorporated into a windshield, double images are disadvantageously formed when the head-up display is viewed in an oblique direction. In particular, the problem of double images increases in head-up displays having a wide viewing angle.

It is an object of the present invention to provide a reflection film capable of suppressing formation of double images on a display image, and a windshield glass and a head-up display system including the reflection film.

[1] A reflection film has a linearly polarized light reflection layer obtained by laminating optically anisotropic layers and isotropic layers and a polarization converting layer.

The polarization converting layer satisfies any of conditions below.

(A) The polarization converting layer is a retardation layer in which a front retardation at a wavelength of 550 nm is 30 nm to 200 nm and an angle between a slow axis direction and a direction of a transmission axis of the linearly polarized light reflection layer is 35° or less.

(B) The polarization converting layer is a layer in which a helical alignment structure of a liquid crystal compound is fixed, and a number of pitches x in the helical alignment structure and a film thickness y (unit μm) of the polarization converting layer satisfy all relational expressions below.

$$0.1 \leq x \leq 1.0 \quad \text{(i)}$$

$$0.5 \leq y \leq 3.0 \quad \text{(ii)}$$

$$3000 \leq (1560xy)/x \leq 50000 \quad \text{(iii)}$$

[2] In the reflection film according to [1], the polarization converting layer is a retardation layer in which the front retardation at a wavelength of 550 nm is 50 nm to 120 nm and the angle between a slow axis direction and a direction of a transmission axis of the linearly polarized light reflection layer is 20° or less.

[3] In the reflection film according to [1] or [2], a number of the optically anisotropic layers and the isotropic layers laminated in the linearly polarized light reflection layer is 10 to 60.

[4] A windshield glass has the reflection film according to any one of [1] to [3], and a first curved glass and a second curved glass that sandwich the reflection film.

In the windshield glass, the linearly polarized light reflection layer, the polarization converting layer, and the first curved glass are laminated in this order on a convex surface of the second curved glass.

[5] A head-up display system has the windshield glass according to [4] and a projector that emits p-polarized projection image light through the second curved glass of the windshield glass.

The present invention can provide a reflection film, a windshield glass, and a head-up display system capable of suppressing formation of double images of a display image.

DESCRIPTION OF THE PREFERRED EMBODIMENTS

Figure 1:
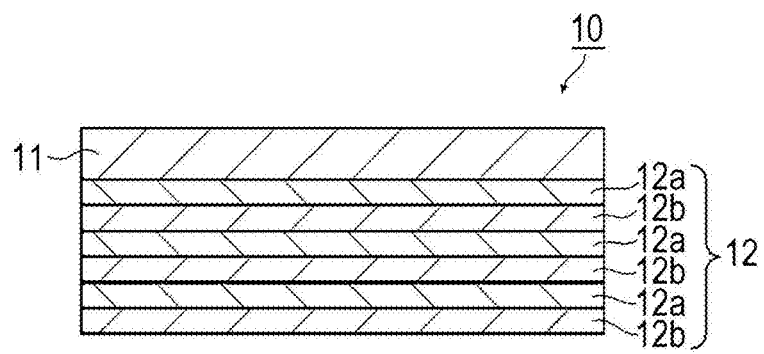
FIG. 1 is a schematic view illustrating an example of a reflection film according to an embodiment of the present invention.

Hereafter, a reflection film, a windshield glass, and a head-up display system according to embodiments of the present invention will be described in detail based on preferred embodiments illustrated in the attached drawings.

The drawings used for the following description are merely examples for describing the present invention, and the present invention is not limited to the drawings mentioned hereafter.

Hereafter, numerical values before and after "to" are inclusive in the numerical range. For example, when $\varepsilon_1$ is a value $\alpha_1$ to a value $\beta_1$, the range of si is a range including the value $\alpha_1$ and the value $\beta_1$, which is expressed by mathematical symbols as $\alpha_1 \leq \varepsilon_1 \leq \beta_1$.

The angles such as "angles expressed by specific values", "parallel", "vertical", and "orthogonal" include a margin of error generally tolerable in the corresponding technical field unless otherwise specified.

The "same" includes a margin of error generally tolerable in the corresponding technical field and, for example, the "entire surface" also includes a margin of error generally tolerable in the corresponding technical field.

The term "light" refers to light satisfying both visible light and natural light (unpolarized light) unless otherwise specified. Among electromagnetic waves, visible light is light that has wavelengths visible to the human eye and normally has wavelengths of 380 to 780 nm. Non-visible light refers to light having a wavelength range of less than 380 nm or a wavelength range of more than 780 nm.

Visible light having a wavelength range of 420 to 490 nm is blue (B) light, visible light having a wavelength range of 495 to 570 nm is green (G) light, and visible light having a wavelength range of 620 to 750 nm is red (R) light, though not limited thereto.

The term "visible light transmittance" refers to a transmittance of visible light from an A light source, which is defined in JIS (Japanese Industrial Standards) R 3212:2015 (Test methods of safety glazing materials for road vehicles). That is, the visible light transmittance is a transmittance determined by measuring the transmittance at each wavelength of 380 to 780 nm with a spectrophotometer using an A light source, multiplying the transmittance at each wavelength by the weighting function obtained from the wavelength distribution and wavelength interval of the CIE (International Commission on Illumination) photopic luminous efficiency function, and calculating a weighted average.

The "reflected light" or "transmitted light" simply mentioned includes scattered light and diffracted light.

The p-polarized light refers to polarized light that oscillates in a direction parallel to the incidence plane of light. The incidence plane is a plane that is vertical to the reflection plane (e.g., windshield glass surface) and that includes incident light and reflected light. In the p-polarized light, the oscillation plane of an electric field vector is parallel to the incidence plane.

The front retardation is measured using an AxoScan manufactured by Axometrics. The measurement wavelength is set to 550 nm unless otherwise specified. The front retardation may also be measured using a KOBRA 21ADH or a KOBRA WR (manufactured by Oji Scientific Instruments) by casting light having a wavelength in the visible wavelength range in the direction normal to the film. For the selection of the measurement wavelength, a wavelength selective filter can be manually changed or the measured value can be converted, for example, by using a program.

The term "projection image" refers to an image based on the projection of light from a projector used, but not a surrounding view such as a front view. The projection image is observed as a virtual image that emerges in an area ahead of a reflection film of a windshield glass when viewed from a viewer.

The term "screen image" refers to an image displayed on a drawing device of a projector or an image drawn on, for example, an intermediate image screen by the drawing device. As opposed to the virtual image, the screen image is a real image.

Each of the screen image and the projection image may be a monochrome image, a multicolored image with two or more colors, or a full-color image.

Reflection Film

The reflection film according to an embodiment of the present invention has a linearly polarized light reflection layer in which optically anisotropic layers and isotropic layers are laminated and a polarization converting layer, and the polarization converting layer satisfies any of conditions below.

(A) The polarization converting layer is a retardation layer in which the front retardation is 30 nm to 200 nm and the angle between a slow axis direction and a direction of the transmission axis of the linearly polarized light reflection layer is 35° or less.

(B) The polarization converting layer is a layer in which a helical alignment structure of a liquid crystal compound is fixed, and the number of pitches x in the helical alignment structure and the film thickness y (unit μm) of the polarization converting layer satisfy all relational expressions below.

$$0.1 \leq x \leq 1.0 \quad \text{(i)}$$

$$0.5 \leq y \leq 3.0 \quad \text{(ii)}$$

$$3000 \leq (1560 \times y)/x \leq 50000 \quad \text{(iii)}$$

FIG. 1 is a schematic view illustrating an example of a reflection film according to an embodiment of the present invention. As illustrated in FIG. 1, the reflection film 10 has a linearly polarized light reflection layer 12 in which optically anisotropic layers 12a and isotropic layers 12b are alternately laminated and a polarization converting layer 11.

Linearly Polarized Light Reflection Layer

In the linearly polarized light reflection layer 12, the refractive index $n_{e1}$ in a slow axis direction of the optically anisotropic layers 12a is larger than the refractive index $n_{o2}$ of the isotropic layers 12b, and the refractive index $n_{o1}$ in a direction orthogonal to the slow axis of the optically anisotropic layers 12a is substantially the same as the refractive index 1102 of the isotropic layers 12b. The plurality of optically anisotropic layers 12a are laminated so that their slow axes are parallel to each other. Therefore, layers having a high refractive index ($n_{e1}$) and layers having a low refractive index ($n_{o2}$) are laminated in one direction. On the other hand, layers having the same refractive index are laminated in a direction orthogonal to the one direction.

Films in which layers having a low refractive index (low-refractive-index layers) and layers having a high refractive index (high-refractive-index layers) are alternately laminated are known to reflect light having a particular wavelength because of structural interference between a large number of low-refractive-index layers and a large number of high-refractive-index layers. Therefore, the linearly polarized light reflection layer reflects linearly polarized light in the slow axis direction (high-refractive-index direction) of the optically anisotropic layers 12a and transmits linearly polarized light in a direction orthogonal to the slow axis.

That is, the linearly polarized light reflection layer 12 is a layer that selectively reflects linearly polarized light in a particular wavelength range. The linearly polarized light reflection layer 12 preferably exhibits selective reflection in part of the visible light wavelength range. It is sufficient that the linearly polarized light reflection layer 12 reflects, for example, light for displaying a projection image. The reflection film 10 may have a plurality of linearly polarized light reflection layers 12 corresponding to respective wavelength ranges.

The linearly polarized light reflection layer 12 can transmit linearly polarized light that is not reflected. Therefore, when the reflection film 10 has the linearly polarized light reflection layer 12, the reflection film 10 can also partly transmit light in a wavelength range in which the linearly polarized light reflection layer 12 exhibits reflection. Therefore, the linearly polarized light reflection layer 12 is preferred because the deterioration of tint of light that has passed through the reflection film 10 is suppressed and a decrease in visible light transmittance is also suppressed.

In the linearly polarized light reflection layer in which low-refractive-index layers and high-refractive-index layers are laminated, the reflection wavelength and the reflectivity can be controlled by, for example, the difference in refractive index between the low-refractive-index layers and the high-refractive-index layers, the thickness, and the number of laminated layers. Specifically, the wavelength λ of light to be reflected can be controlled by setting the thicknesses d of the low-refractive-index layers and the high-refractive-index layers so as to satisfy d=λ/(4×n), where n represents a refractive index. Since the reflectivity increases as the number of laminated low-refractive-index layers and high-refractive-index layers increases, the reflectivity can be controlled by adjusting the number of laminated layers. The width of the reflection band can be controlled by the difference in refractive index between the low-refractive-index layers and the high-refractive-index layers.

The material for the linearly polarized light reflection layer and the method for producing the linearly polarized light reflection layer may be, for example, those described in JP1997-506837A (JP-H9-506837A). Specifically, when processing is performed under conditions selected to obtain the refractive index relation, various materials may be employed to form the linearly polarized light reflection layer. In general, a first material needs to have, in a selected direction, a refractive index different from that of a second material. This difference in refractive index can be provided by various methods such as stretching during or after formation of a film, extrusion forming, or coating. In addition, the two materials preferably have similar rheological characteristics (for example, melt viscosity) so as to be extruded simultaneously.

The linearly polarized light reflection layer may be a commercially available product. The commercially available product may be a laminated body of a reflective polarizing plate and a temporary support. Examples of the commercially available product include commercially available optical films such as DBEF (registered trademark) (manufactured by 3M) and APF (Advanced Polarizing Film (manufactured by 3M)).

It is sufficient that the thickness of the linearly polarized light reflection layer is preferably 2.0 μm to 50 μm and more preferably 8.0 μm to 30 μm.

The number of optically anisotropic layers and isotropic layers laminated in the linearly polarized light reflection layer may be appropriately set in accordance with the required reflectivity or the like, and is preferably 10 to 60.

Polarization Converting Layer

The polarization converting layer 11 is (A) a retardation layer in which the front retardation is 30 nm to 200 nm and the angle between a slow axis direction and a direction of the transmission axis of the linearly polarized light reflection layer is 35° or less or (B) a layer in which a helical alignment structure of a liquid crystal compound is fixed, and the number of pitches x in the helical alignment structure and the film thickness y (unit μm) of the polarization converting layer satisfy all relational expressions below.

$$0.1 \leq x \leq 1.0 \tag{i}$$

$$0.5 \leq y \leq 3.0 \tag{ii}$$

$$3000 \leq (1560 \times y)/x \leq 50000 \tag{iii}$$

As described above, in a head-up display that reflects p-polarized light, when a reflection film having a linearly polarized light reflection layer is incorporated into a windshield glass, double images are disadvantageously formed when the head-up display is viewed in an oblique direction. In particular, the problem of double images increases in head-up displays having a wide viewing angle.

When p-polarized light enters the windshield glass, reflection by the glass is considerably reduced. Therefore, formation of double images caused by light reflected at the surface of the windshield glass can be eliminated.

However, when linearly polarized light obliquely enters the linearly polarized light reflection layer, the polarization state of the transmitted light changes to, for example, elliptically polarized light. An s-polarized light component of the elliptically polarized light is reflected at the interface of the glass on the back surface side (the surface opposite to a surface on which a projection image from a projector is incident) and visually recognized as a screen image. Therefore, a screen image reflected by the linearly polarized light reflection layer and a screen image reflected at the interface of the glass on the back surface side are visually recognized as a double image.

In contrast, in the present invention, the reflection film 10 has a polarization converting layer 11 having a predetermined configuration, and the linearly polarized light reflection layer 12 is disposed on the front surface side (the surface on which a projection image from a projector is incident) of the windshield glass and the polarization converting layer 11 is disposed on the back surface side. In such a configuration, when linearly polarized light (p-polarized light) obliquely enters the linearly polarized light reflection layer 12, the transmitted light (s-polarized light) is changed to elliptically polarized light or the like by the linearly polarized light reflection layer 12 and enters the polarization converting layer 11. When the above configuration is satisfied, the polarization converting layer 11 converts the incident elliptically polarized light or the like into p-polarized light. This allows p-polarized light to enter the glass on the back surface side, which can suppress reflection by the glass and suppress formation of double images.

When the above configuration is satisfied, the polarization converting layer 11 maintains light that enters the reflection film 10 at an incidence angle of 0 degrees as p-polarized light, which suppresses the influence of double images in a wide range.

The polarization state of s-polarized light incident from the outside of the windshield glass is changed by the linearly polarized light reflection layer 12. In contrast, when the reflection film 10 has the polarization converting layer 11, s-polarized light that has passed through the reflection film 10 can be maintained as s-polarized light, which can improve the suitability for polarizing sunglasses.

Hereafter, the case where the polarization converting layer 11 is the above-described retardation layer will be described as a polarization converting layer A, and the case where the polarization converting layer 11 is a layer in which the helical alignment structure is fixed will be described as a polarization converting layer B.

Polarization Converting Layer A

The polarization converting layer A is a retardation layer in which the front retardation is 30 nm to 200 nm and the angle between a slow axis direction and a direction of the transmission axis of a linearly polarized light reflection layer is 35° or less.

The retardation layer is not particularly limited and may be appropriately selected in accordance with the purpose as long as the front retardation is 30 nm to 200 nm. Examples of the retardation layer include stretched polycarbonate films, stretched norbornene polymer films, transparent films in which inorganic particles having birefringence, such as strontium carbonate, are aligned, thin films obtained by subjecting an inorganic dielectric to oblique deposition on the support, films obtained by uniaxially aligning and fixing a polymerizable liquid crystal compound, and films obtained by uniaxially aligning and fixing a liquid crystal compound.

In particular, films obtained by uniaxially aligning and fixing a polymerizable liquid crystal compound are suitably exemplified as the retardation layer.

For example, such a retardation layer can be formed by applying a liquid crystal composition including a polymerizable liquid crystal compound onto a temporary support or a surface of an alignment layer, subjecting a polymerizable liquid crystal compound in a liquid crystal state in the liquid crystal composition to nematic alignment, and then fixing the polymerizable liquid crystal compound by performing curing.

The retardation layer may be a layer obtained by applying a composition including a high-molecular-weight liquid crystal compound onto a temporary support or a surface of an alignment layer or the like to form nematic alignment in a liquid crystal state, and then fixing the alignment by cooling.

The thickness of the retardation layer is not limited, and is preferably 0.2 μm to 300 μm, more preferably 0.5 μm to 150 μm, and further preferably 1.0 μm to 80 μm. The thickness of the retardation layer formed of the liquid crystal composition is not particularly limited, and is preferably 0.2 μm to 10 μm, more preferably 0.5 μm to 5.0 μm, and further preferably 0.7 μm to 2.0 μm.

The front retardation of the retardation layer at a wavelength of 550 nm is preferably 50 nm to 120 nm and more preferably 70 nm to 120 nm. When the front retardation of the retardation layer is within this range, formation of double images can be more suitably suppressed.

Figure 2:
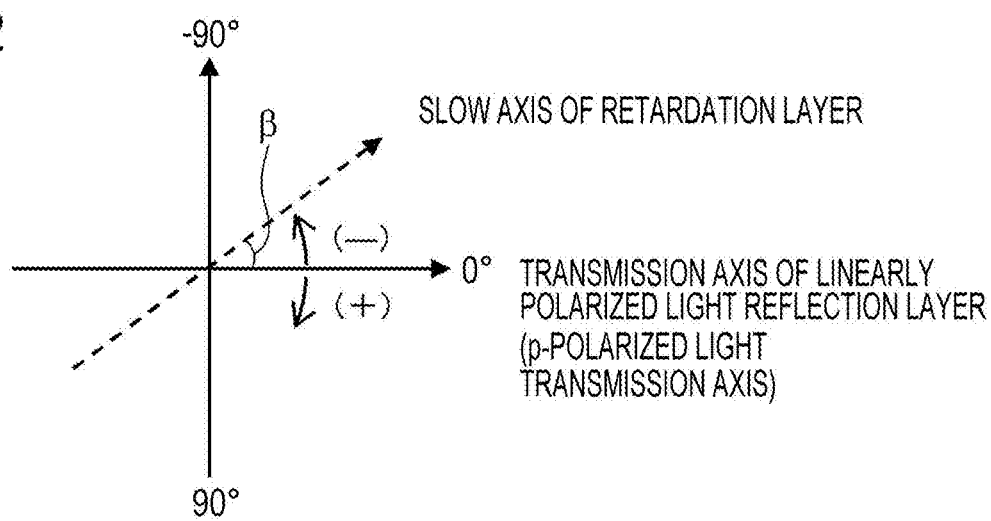
FIG. 2 is a diagram illustrating the angle between a direction of the transmission axis of a linearly polarized light reflection layer and a direction of the slow axis of a retardation layer.

As illustrated in FIG. 2, the retardation layer is disposed so that the angle β between the slow axis direction of the retardation layer and the transmission axis direction of the linearly polarized light reflection layer is 35° or less. The angle β is preferably 20° or less and more preferably 15° or less. When the angle β is within this range, formation of double images can be more suitably suppressed. In the following description, when the reflection film 10 is viewed from the front side and the transmission axis direction of the linearly polarized light reflection layer is 0°, the angle in the slow axis direction of the retardation layer with respect to the transmission axis direction of the linearly polarized light reflection layer is expressed as "+" in a clockwise direction and "−" in a counterclockwise direction.

Figure 3:
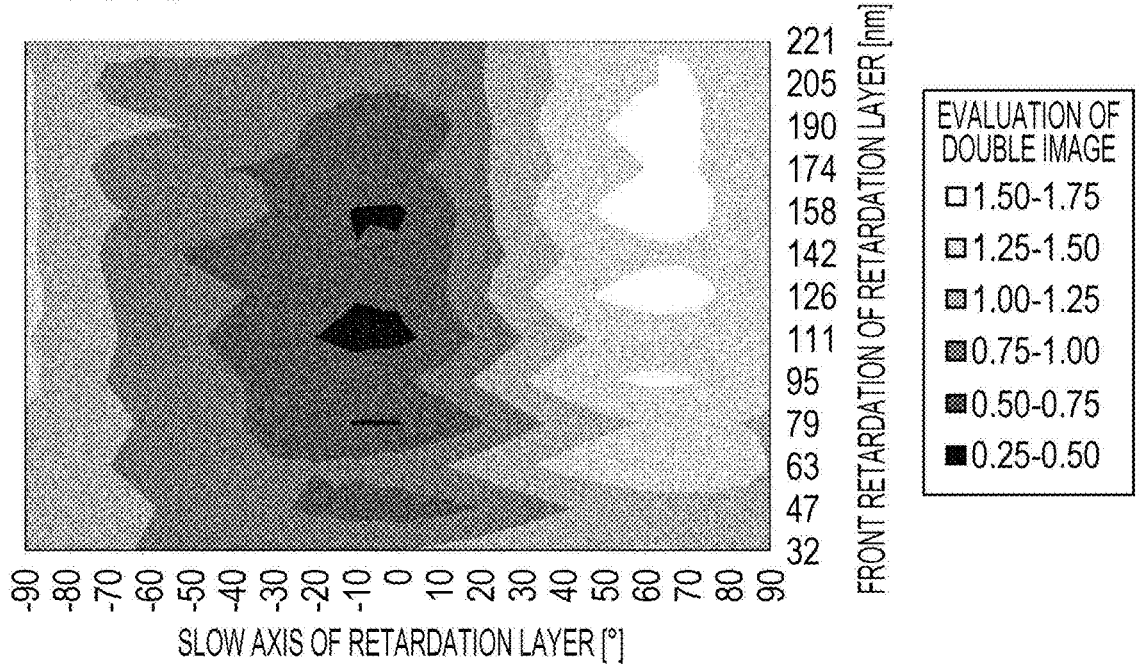
FIG. 3 is a graph illustrating the relationship between the angle of the slow axis of the retardation layer, the front retardation of the retardation layer, and the evaluation of double images.

FIG. 3 illustrates simulation results on the relationship between the front retardation and angle β of the retardation layer and the formation of double images. In FIG. 3, the horizontal axis represents an angle β of the slow axis direction of the retardation layer with respect to the transmission axis direction of the linearly polarized light reflection layer. The vertical axis represents a front retardation of the retardation layer. The value represents a ratio of light reflected at the back surface of the glass to reflected light. This value corresponds to a value used in the evaluation of double images in Examples described later.

In the simulation, the linearly polarized light reflection layer was formed as a laminated body in which optically anisotropic layers formed of PEN having a refractive index of 1.86 in the slow axis direction and isotropic layers formed of coPEN having a refractive index of 1.64 were alternately laminated, and modeling was performed by appropriately setting the film thickness so that the visible light reflectivity was 20%. Double images were evaluated when observed in a direction at a polar angle of 20° in the horizontal direction.

As is clear from FIG. 3, when the front retardation is 30 nm to 200 nm and the angle between the slow axis direction and the transmission axis direction of the linearly polarized light reflection layer is 35° or less, the formation of double images is reduced.

Polarization Converting Layer B

The polarization converting layer B is a layer in which a helical alignment structure (helical structure) of a liquid crystal compound is fixed, and the number of pitches x in the helical alignment structure and the film thickness y (unit μm) of the polarization converting layer satisfy all relational expressions below.

$0.1 \leq x \leq 1.0$  (i)

$0.5 \leq y \leq 3.0$  (ii)

$3000 \leq (1560xy)/x \leq 50000$  (iii)

One pitch of the helical structure of the liquid crystal compound corresponds to one turn of the helix of the liquid crystal compound. That is, when the director (a major axis direction in the case of a rod-like liquid crystal) of a liquid crystal compound subjected to helical alignment is rotated by 360°, the number of pitches is defined as 1.

When the polarization converting layer B has a helical structure of a liquid crystal compound, optical rotation and birefringence are exhibited for visible light having a wavelength shorter than the reflection peak wavelength in an infrared region. Therefore, the polarization of light in a visible region can be controlled. When the number of pitches x of the helical alignment structure of the polarization converting layer B and the film thickness y of the polarization converting layer are within the above ranges, optical compensation can be performed in the polarization converting layer B. Therefore, as described above, the transmitted light that has been changed to elliptically polarized light or the like is converted into p-polarized light by the linearly polarized light reflection layer 12. This allows p-polarized light to enter the glass on the back surface side, which can suppress reflection by the glass and suppress formation of double images.

Since the liquid crystal compound has a helical structure that satisfies the relational expressions (i) to (iii), the polarization converting layer B exhibits optical rotation and birefringence for visible light. In particular, by setting the pitch P of the helical structure of the polarization converting layer B to a length corresponding to the pitch P of the cholesteric liquid crystal layer having a long selective reflection center wavelength in the infrared region, high optical rotation and high birefringence are exhibited for visible light having shorter wavelengths.

The relational expression (i) is "$0.1 \leq x \leq 1.0$".

When the number of pitches x of the helical structure is less than 0.1, for example, sufficient optical rotation and birefringence are not achieved.

When the number of pitches x of the helical structure is more than 1.0, the optical rotation and the birefringence are excessive, which fails to provide desired elliptically polarized light, for example.

The relational expression (ii) is "$0.5 \leq y \leq 3.0$".

When the film thickness y of the polarization converting layer B is less than 0.5 μm, the film thickness is excessively small, which fails to provide sufficient optical rotation and birefringence, for example.

When the film thickness y of the polarization converting layer B is more than 3.0 μm, the optical rotation and the birefringence are excessive, which fails to provide desired elliptically polarized light and easily causes alignment defects that are not preferred for production, for example.

The relational expression (iii) is "$3000 \leq (1560 \times y)/x \leq 50000$".

When "$(1560 \times y)/x$" is less than 3000, the optical rotation is excessive, which fails to provide desired polarized light.

When "$(1560 \times y)/x$" is more than 50000, the optical rotation is insufficient, which fails to provide desired polarized light.

In the present invention, the number of pitches x of the helical structure of the polarization converting layer B is preferably 0.1 to 0.5, and the film thickness y is preferably 1.0 μm to 3.0 μm.

That is, in the polarization converting layer B, the pitch P of the helical structure is preferably long and the number of pitches x is preferably small.

Specifically, in the polarization converting layer B, the pitch P of the helix is preferably equal to the pitch P of the cholesteric liquid crystal layer having a long selective reflection center wavelength in the infrared region, and the number of pitches x is preferably small. More specifically, in the polarization converting layer B, the pitch P of the helix is preferably equal to the pitch P of a cholesteric liquid crystal layer having a selective reflection center wavelength of 3000 to 10000 nm, and the number of pitches x is preferably small.

Since the selective reflection center wavelength corresponding to the pitch P is much longer than that of visible light, such a polarization converting layer B more suitably exhibits the above-described optical rotation and birefringence for visible light. Therefore, the effect of suppressing formation of double images can be further improved.

Such a polarization converting layer B can be basically formed in the same manner as publicly known cholesteric liquid crystal layers. In formation of the polarization converting layer B, it is necessary to adjust, for example, a liquid crystal compound used, a chiral agent used, the amount of the chiral agent added, and the film thickness so that the number of pitches x of the helical structure and the film thickness y [μm] in the polarization converting layer B satisfy all of the relational expressions (i) to (iii).

Layer in which Helical Alignment Structure (Helical Structure) of Liquid Crystal Compound is Fixed The layer in which the helical alignment structure (helical structure) of a liquid crystal compound is fixed is a so-called cholesteric liquid crystal layer, and refers to a layer in which a cholesteric liquid crystal phase is fixed.

The cholesteric liquid crystal layer may be any layer as long as the alignment of a liquid crystal compound in the state of a cholesteric liquid crystal phase is maintained. Typically, the cholesteric liquid crystal layer may be any layer as long as the polymerizable liquid crystal compound is brought into the alignment state of a cholesteric liquid crystal phase and polymerized and cured by, for example, ultraviolet irradiation and heating to form a layer which has no fluidity and also whose alignment state is not changed by an external field or an external force. In the cholesteric liquid crystal layer, the liquid crystal compound in the layer does not necessarily exhibit liquid crystallinity as long as the optical properties of the cholesteric liquid crystal phase are maintained in the layer. For example, the polymerizable liquid crystal compound may lose its liquid crystallinity as a result of an increase in the molecular weight due to curing reaction.

The center wavelength λ of selective reflection (selective reflection center wavelength) by the cholesteric liquid crystal layer is dependent on the pitch P (=helical period) of the helical structure (helical alignment structure) in a cholesteric liquid crystal phase and satisfies the formula $\lambda = n \times P$, where n represents an average refractive index of the cholesteric liquid crystal layer. As is clear from the above formula, the selective reflection center wavelength can be controlled by adjusting the n value and/or the P value.

In other words, the pitch P (one pitch of the helix) of the helical structure is a length in the helical axis direction corresponding to one turn of the helix, that is, a length in the helical axis direction at which the director (a major axis direction in the case of a rod-like liquid crystal) of a liquid crystal compound constituting the cholesteric liquid crystal phase is rotated by 360°. The helical axis direction of a typical cholesteric liquid crystal layer matches the thickness direction of the cholesteric liquid crystal layer.

The selective reflection center wavelength and the half-width of the cholesteric liquid crystal layer can be determined as follows, for example.

When the reflection spectrum of the cholesteric liquid crystal layer is measured in the normal direction using a spectrophotometer (manufactured by JASCO Corporation, V-670), a peak having a decreased transmittance is observed in the selective reflection band. Of two wavelengths at the minimum transmittance of this peak and the intermediate (average) transmittance between the minimum transmittance and the transmittance of a peak whose transmittance is not decreased, when the shorter wavelength is defined as $\lambda_l$ (nm) and the longer wavelength is defined as $\lambda_h$ (nm), the selective reflection center wavelength $\lambda$ and the half-width $\Delta\lambda$ can be expressed by the following formula.

$$\lambda=(\lambda_l+\lambda_h)/2 \Delta\lambda=(\lambda_h-\lambda_l)$$

The selective reflection center wavelength determined as described above is substantially equal to the wavelength at the barycentric position of the reflection peak of the circularly polarized light reflection spectrum measured in a direction normal to the cholesteric liquid crystal layer.

The helical pitch of the cholesteric liquid crystal phase is dependent on the type of chiral agent used together with the polymerizable liquid crystal compound and the concentration of the chiral agent added. Therefore, a desired pitch can be achieved by controlling the type and the concentration. The sense and pitch of a helix can be measured by the methods described in p. 46 of "Ekisho Kagaku Jikken Nyumon (Introduction of Liquid Crystal Chemical Experiments)" edited by The Japanese Liquid Crystal Society, published by SIGMA SHUPPAN, 2007 and p. 196 of "Handbook of Liquid Crystals" edited by the Editorial Board of the Handbook of Liquid Crystals, published by Maruzen Co., Ltd.

As described above, the helical pitch of the cholesteric liquid crystal layer used as the polarization converting layer B is adjusted so that the selective reflection center wavelength is a longer wavelength in the infrared region.

Production Method of Cholesteric Liquid Crystal Layer

Hereafter, a material for the cholesteric liquid crystal layer and a method for producing the cholesteric liquid crystal layer will be described.

The material used for forming the cholesteric liquid crystal layer is, for example, a liquid crystal composition including a polymerizable liquid crystal compound and a chiral agent (optically active compound). The above-described liquid crystal composition that is optionally further mixed with, for example, a surfactant and a polymerization initiator and dissolved in a solvent or the like is applied onto, for example, a support, an alignment layer, and a cholesteric liquid crystal layer to serve as an underlayer. After cholesteric alignment is matured, the alignment can be fixed by curing the liquid crystal composition to form a cholesteric liquid crystal layer.

Polymerizable Liquid Crystal Compound

The polymerizable liquid crystal compound may be a rod-like liquid crystal compound or a disc-like liquid crystal compound, but is preferably a rod-like liquid crystal compound.

The rod-like polymerizable liquid crystal compound for forming the cholesteric liquid crystal layer is, for example, a rod-like nematic liquid crystal compound. Preferred examples of the rod-like nematic liquid crystal compound include azomethines, azoxies, cyanobiphenyls, cyanophenyl esters, benzoic acid esters, cyclohexanecarboxylic acid phenyl esters, cyanophenyl cyclohexanes, cyano-substituted phenylpyrimidines, alkoxy-substituted phenylpyrimidines, phenyldioxanes, tolans, and alkenyl cyclohexylbenzonitriles. Not only low-molecular-weight liquid crystal compounds, but also high-molecular-weight liquid crystal compounds can be used.

The polymerizable liquid crystal compound is obtained by introducing a polymerizable group into a liquid crystal compound. Examples of the polymerizable group include unsaturated polymerizable groups, an epoxy group, and an aziridinyl group. Unsaturated polymerizable groups are preferred and ethylenically unsaturated polymerizable groups are particularly preferred. The polymerizable group can be introduced into a molecule of a liquid crystal compound by various methods. The number of polymerizable groups in the polymerizable liquid crystal compound is preferably 1 to 6 and more preferably 1 to 3 in one molecule.

Examples of the polymerizable liquid crystal compound include compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-328973A. Two or more polymerizable liquid crystal compounds may be used in combination. The combined use of two or more polymerizable liquid crystal compounds enables alignment at low temperature.

The amount of the polymerizable liquid crystal compound added to the liquid crystal composition is preferably 80 to 99.9 mass %, more preferably 85 to 99.5 mass %, and particularly preferably 90 to 99 mass % relative to the mass of solids (the mass excluding the mass of solvent) in the liquid crystal composition.

Chiral Agent: Optically Active Compound

The chiral agent has a function of inducing a helical structure of the cholesteric liquid crystal phase. The chiral compound may be selected in accordance with the purpose because the helical sense or helical pitch to be induced varies depending on the compound.

The chiral agent is not particularly limited, and publicly known compounds can be used. Examples of the chiral agent include compounds described in Liquid Crystal Device Handbook (chapter 3, section 4-3, Chiral Agent for TN and STN, p. 199, edited by 142nd Committee of Japan Society for the Promotion of Science, 1989), JP2003-287623A, JP2002-302487A, JP2002-80478A, JP2002-80851A, JP2010-181852A, and JP2014-034581A.

Although chiral agents generally include asymmetric carbon atoms, axial asymmetric compounds or planar asymmetric compounds, which include no asymmetric carbon atoms, can also be used as chiral agents. Examples of axial asymmetric compounds or planar asymmetric compounds include binaphthyls, helicenes, paracyclophanes, and derivatives thereof.

The chiral agent may have a polymerizable group. When the chiral agent and the liquid crystal compound each have a polymerizable group, a polymer having a repeating unit derived from the polymerizable liquid crystal compound and a repeating unit derived from the chiral agent can be formed by the polymerization reaction between the polymerizable chiral agent and the polymerizable liquid crystal compound. In this case, the polymerizable group of the polymerizable chiral agent is preferably the same type of group as the polymerizable group of the polymerizable liquid crystal compound. Therefore, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

The chiral agent may be a liquid crystal compound.

Preferred examples of the chiral agent include isosorbide derivatives, isomannide derivatives, and binaphthyl derivatives. The isosorbide derivative may be a commercially available product such as LC756 manufactured by BASF.

The content of the chiral agent in the liquid crystal composition is preferably 0.01 to 200 mol % and more preferably 1 to 30 mol % relative to the amount of the polymerizable liquid crystal compound. Note that the content of the chiral agent in the liquid crystal composition refers to a concentration (mass %) of the chiral agent relative to the total solid content in the composition.

Polymerization Initiator

The liquid crystal composition preferably contains a polymerization initiator. In the case where polymerization reaction is caused to proceed through ultraviolet irradiation, the polymerization initiator used is preferably a photopolymerization initiator capable of initiating polymerization reaction through ultraviolet irradiation.

Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimers and p-aminophenyl ketone (described in U.S. Pat. No. 3,549,367A), acridine and phenazine compounds (described in JP1985-105667A (JP-S60-105667A) and U.S. Pat. No. 4,239,850A), acylphosphine oxide compounds (JP1988-40799B (JP-S63-40799B), JP1993-29234B (JP-H05-29234B), JP1998-95788A (JP-H10-95788A), and JP1998-29997A (JP-H10-29997A), JP2001-233842A, JP2000-80068A, JP2006-342166A, JP2013-114249A, JP2014-137466A, JP4223071B, JP2010-262028A, and JP2014-500852A), oxime compounds (described in JP2000-66385A and JP4454067B), and oxadiazole compounds (described in U.S. Pat. No. 4,212,970A). For example, the description in paragraphs 0500 to 0547 of JP2012-208494A can also be taken into consideration.

The polymerization initiator is also preferably an acylphosphine oxide compound or an oxime compound.

The acylphosphine oxide compound is, for example, a commercially available IRGACURE 810 (compound name: bis(2,4,6-trimethylbenzoyl)-phenylphosphine oxide) manufactured by BASF Japan. Examples of the oxime compound include commercially available products such as IRGACURE OXE01 (manufactured by BASF), IRGACURE OXE02 (manufactured by BASF), TR-PBG-304 (manufactured by Changzhou Tronly New Electronic Materials Co., Ltd.), ADEKA ARKLS NCI-831, ADEKA ARKLS NCI-930 (manufactured by ADEKA Corporation), and ADEKA ARKLS NCI-831 (manufactured by ADEKA Corporation).

The polymerization initiators may be used alone or in combination of two or more.

The content of the photopolymerization initiator in the liquid crystal composition is preferably 0.1 to 20 mass % and more preferably 0.5 to 5 mass % relative to the content of the polymerizable liquid crystal compound.

Crosslinking Agent

The liquid crystal composition may optionally contain a crosslinking agent to improve the film hardness and durability after curing. Crosslinking agents that are curable by, for example, ultraviolet rays, heat, or moisture can be suitably used.

The crosslinking agent is not particularly limited, and can be appropriately selected in accordance with the purpose. Examples of the crosslinking agent include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having oxazoline side groups; and alkoxysilane compounds such as vinyltrimethoxysilane and N-(2-aminoethyl)3-aminopropyltrimethoxysilane. Furthermore, a publicly known catalyst can be used in accordance with the reactivity of the crosslinking agent. This can improve the productivity in addition to the film hardness and the durability. These solvents may be used alone or in combination of two or more.

The content of the crosslinking agent is preferably 3 to 20 mass % and more preferably 5 to 15 mass %. When the content of the crosslinking agent is 3 mass % or more, the crosslinking density can be improved. When the content of the crosslinking agent is 20 mass % or less, deterioration of the stability of the cholesteric liquid crystal layer can be prevented.

The term "(meth)acrylate" refers to "one or both of acrylate and methacrylate".

Alignment Controlling Agent

The liquid crystal composition may contain an alignment controlling agent that contributes to stably or rapidly providing a cholesteric liquid crystal layer having planar alignment. Examples of the alignment controlling agent include fluorine (meth)acrylate polymers described in paragraphs [0018] to [0043] of JP2007-272185A, compounds represented by formulae (I) to (IV) described in paragraphs [0031] to [0034] of JP2012-203237A, and compounds described in JP2013-113913A.

The alignment controlling agents may be used alone or in combination of two or more.

The amount of the alignment controlling agent added to the liquid crystal composition is preferably 0.01 to 10 mass %, more preferably 0.01 to 5 mass %, and particularly preferably 0.02 to 1 mass % relative to the total mass of the polymerizable liquid crystal compound.

Other Additives

The liquid crystal composition may further contain at least one selected from the group consisting of various additives such as surfactants for adjusting the surface tension of a coating to make the thickness uniform and polymerizable monomers. The liquid crystal composition may further optionally contain, for example, a polymerization inhibitor, an antioxidant, an ultraviolet absorber, a light stabilizer, a coloring material, and fine metal oxide particles to the degree that the optical performance is not degraded.

The cholesteric liquid crystal layer can be formed by the following method. A liquid crystal composition prepared by dissolving a polymerizable liquid crystal compound, a polymerization initiator, an optionally added chiral agent, an optionally added surfactant, and the like in a solvent is applied onto a support, an alignment layer, or the like. The liquid crystal composition is dried to obtain a coating. The coating is irradiated with active rays to polymerize the cholesteric liquid crystal composition. Thus, a cholesteric liquid crystal layer whose cholesteric regularity is fixed is obtained.

Solvent

The solvent used for preparing the liquid crystal composition is not particularly limited. The solvent can be appropriately selected in accordance with the purpose, and an organic solvent is preferably used.

The organic solvent is not particularly limited, and can be appropriately selected in accordance with the purpose. Examples of the organic solvent include ketones, alkyl halides, amides, sulfoxides, heterocyclic compounds, hydrocarbons, esters, and ethers. These solvents may be used alone or in combination of two or more. In particular, ketones are preferred in consideration of environmental load.

Coating, Alignment, and Polymerization

The coating method of the liquid crystal composition onto a support, an alignment layer, and the like is not particularly limited, and can be appropriately selected in accordance with the purpose. Examples of the coating method include wire bar coating, curtain coating, extrusion coating, direct gravure coating, reverse gravure coating, die coating, spin coating, dip coating, spray coating, and slide coating. Alternatively, a liquid crystal composition that has been applied onto another support may be transferred.

By heating the applied liquid crystal composition, liquid crystal molecules are aligned. The heating temperature is preferably 200° C. or lower and more preferably 130° C. or lower. This alignment treatment provides an optical thin film in which the polymerizable liquid crystal compound is twistedly aligned so as to have a helical axis in a direction substantially perpendicular to the film surface.

The aligned liquid crystal compound can be further polymerized to cure the liquid crystal composition. The polymerization may be thermal polymerization or photopolymerization that uses irradiation with light, but is preferably photopolymerization. The irradiation with light is preferably performed by using ultraviolet rays. The irradiation energy is preferably 20 mJ/cm$^2$ to 50 J/cm$^2$ and more preferably 100 mJ/cm$^2$ to 1,500 mJ/cm$^2$.

To facilitate the photopolymerization reaction, the irradiation with light may be performed under heating conditions or in a nitrogen atmosphere. The wavelength of ultraviolet rays applied is preferably 350 to 430 nm. The rate of polymerization reaction is preferably as high as possible from the viewpoint of stability. The rate of polymerization reaction is preferably 70% or more and more preferably 80% or more. The rate of polymerization reaction can be determined from the consumption rate of polymerizable functional groups by measuring an infrared absorption spectrum.

Other Layers

The reflection film 10 according to an embodiment of the present invention may optionally include other layers in addition to the linearly polarized light reflection layer 12 and the polarization converting layer 11.

The other layers are each preferably transparent in the visible light range.

The other layers each preferably have low birefringence. The low birefringence means that the front retardation is 10 nm or less in a wavelength range in which the reflection film 10 of the windshield glass according to an embodiment of the present invention exhibits reflection. The front retardation is preferably 5 nm or less.

Examples of the other layers include a support, an alignment layer, and an adhesive layer.

Support

The support can also be used as a substrate for forming the linearly polarized light reflection layer and/or the polarization converting layer. The support used for forming the linearly polarized light reflection layer and/or the polarization converting layer may be a temporary support that is peeled off after formation of the linearly polarized light reflection layer and/or the polarization converting layer. Therefore, the completed reflection film and windshield glass do not necessarily include a support. Instead of peeling off the temporary support, when the completed reflection film or windshield glass includes a support, the support is preferably transparent in the visible light range.

The material for the support is not limited. The support is a plastic film of, for example, polyester such as polyethylene terephthalate (PET), polycarbonate, acrylic resin, epoxy resin, polyurethane, polyamide, polyolefin, cellulose derivatives, or silicone. The temporary support may be formed of glass instead of the above plastic film.

The thickness of the support may be about 5.0 to 1000 μm, and is preferably 10 to 250 μm and more preferably 15 to 90 μm.

Alignment Layer

The reflection film 10 may include an alignment layer for aligning a liquid crystal compound as an underlayer to which the liquid crystal composition is applied when the polarization converting layer 11 is formed.

The alignment layer can be provided by means of rubbing treatment of an organic compound such as a polymer (resin such as polyimide, polyvinyl alcohol, polyester, polyarylate, polyamide-imide, polyetherimide, polyamide, or modified polyamide), oblique deposition of an inorganic compound, formation of a layer having microgrooves, or accumulation of an organic compound (e.g., ω-tricosanoic acid, diocta-decylmethylammonium chloride, or methyl stearate) by the Langmuir-Blodgett method (LB film). Furthermore, a layer whose alignment function is activated by application of an electric field, application of a magnetic field, irradiation with light, or the like may be used as the alignment layer.

For example, preferably, an alignment layer formed of a polymer is subjected to rubbing treatment and then the liquid crystal composition is applied onto the surface subjected to the rubbing treatment. The rubbing treatment can be performed by rubbing a surface of a polymer layer with paper or cloth in a certain direction.

The liquid crystal composition may be applied onto a surface of the support or a surface of the support subjected to the rubbing treatment without providing an alignment layer. When the liquid crystal layer is formed using a temporary support, the alignment layer may be peeled off together with the temporary support and does not necessarily constitute a reflection member.

The thickness of the alignment layer is preferably 0.01 to 5.0 μm and more preferably 0.05 to 2.0 μm.

Adhesive Layer

The reflection film 10 may optionally have an adhesive layer in order to improve the adhesion strength between layers.

In the illustrated reflection film 10, when an adhesive layer is disposed, the adhesive layer may be disposed between the linearly polarized light reflection layer 12 and the polarization converting layer 11.

The adhesive layer may be formed using an adhesive agent.

From the viewpoint of the type of setting, adhesive agents are classified into hot-melt adhesive agents, thermosetting adhesive agents, photosetting adhesive agents, reaction-setting adhesive agents, and pressure-sensitive adhesive agents requiring no setting. Examples of usable materials for these adhesive agents include compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds. From the viewpoint of workability and productivity, the type of setting is preferably photosetting. From the viewpoint of optical transparency and heat resistance, the material for use is preferably, for example, an acrylate compound, a urethane acrylate compound, or an epoxy acrylate compound.

The adhesive layer may be formed using a high-transparency adhesive transfer tape (OCA tape). The high-transparency adhesive transfer tape may be a commercially available tape for screen image display devices, in particular, a commercially available tape for a surface of a screen image display unit of a screen image display device. Examples of the commercially available tape include an adhesive sheet (e.g., PD-S1) manufactured by PANAC Co., Ltd. and an MHM adhesive sheet manufactured by Nichieikako Co., Ltd.

The thickness of the adhesive layer is not limited. The thickness of the adhesive layer formed using the adhesive agent is preferably 0.5 to 10 μm and more preferably 1.0 to 5.0 μm. The thickness of the adhesive layer formed using the high-transparency adhesive transfer tape (adhesive agent) is preferably 10 to 50 μm and more preferably 15 to 30 μm. The adhesive layer preferably has a uniform thickness to suppress the color unevenness or the like of the reflection film.

Hereafter, a windshield glass having the reflection film according to an embodiment of the present invention and a head-up display (HUD) will be described.

Windshield Glass

A windshield glass having a projection image display function can be provided by using the reflection film according to an embodiment of the present invention.

The windshield glass refers to a window pane and a windscreen of common vehicles such as cars, trains, airplanes, ships, two-wheeled vehicles, and rides. The windshield glass is preferably used as, for example, a windshield and a windscreen present at the front in a direction in which the vehicle travels.

The visible light transmittance of the windshield glass is not limited, but is preferably as high as possible. The visible light transmittance of the windshield glass is preferably 70% or more, more preferably more than 70%, further preferably 75% or more, and particularly preferably 80% or more.

The above visible light transmittance is preferably satisfied at any position of the windshield glass, and is particularly preferably satisfied at a position where the reflection film is present. The reflection film according to an embodiment of the present invention has high visible light transmittance as described above. Therefore, even when the windshield glass is any typically used glass, the above visible light transmittance can be satisfied.

The shape of the windshield glass is not limited, and is appropriately determined in accordance with the object on which the windshield glass is disposed. For example, the windshield glass may have a flat shape or a three-dimensional shape having a curved surface such as a concave surface or a convex surface. In a windshield glass molded for vehicles for use, the top of the windshield glass during normal operation and the surface on the visual side such as the observer side, the driver side, and the inside of a car can be identified.

The windshield glass may have a uniform thickness or a nonuniform thickness in the reflection film. For example, as in a glass for vehicles described in JP2011-505330A, the windshield glass may have a wedge-shaped section and may include a reflection film having a nonuniform thickness, but preferably includes a reflection film having a uniform thickness.

When the reflection film according to an embodiment of the present invention is disposed on an outer surface of a glass plate of the windshield glass, the linearly polarized light reflection film may be disposed inside (on the incidence side of a projection image) or outside a vehicle or the like, but is preferably disposed inside a vehicle or the like.

The reflection film according to an embodiment of the present invention has lower scratch resistance than the glass plate. Therefore, when the windshield glass has a laminated glass structure, the reflection film is more preferably disposed between two glasses constituting the laminated glass in order to protect the reflection film.

As described above, the reflection film is a member for displaying a projection image by reflecting the projection image. Therefore, it is sufficient that the reflection film is disposed at a position at which a projection image projected from a projector or the like can be displayed in a visible manner.

That is, the reflection film according to an embodiment of the present invention functions as a combiner of the HUD. In the HUD, the combiner refers to an optical member that can display, in a visible manner, a screen image projected from a projector while allows simultaneous observation of information, such as a view, on the side opposite to the incidence surface of projection light when the combiner is observed from the incidence side of the projection image. That is, the combiner has a function as an optical path combiner that performs display through superposition of external light and light of the projection image.

The reflection film may be disposed on the whole surface of the windshield glass or on part of the windshield glass in an in-plane direction, but is preferably disposed on part of the windshield glass.

When the reflection film is disposed on part of the windshield glass, the reflection film may be disposed at any position of the windshield glass, but is preferably disposed so that a virtual image is displayed at a position at which an observer such as a driver readily makes a visual identification during operation of the HUD. For example, the position at which the reflection film is disposed on the windshield glass may be determined from the relationship between the position of a driver's seat in a vehicle on which the HUD is mounted and the position at which the projector is disposed.

The reflection film may have a flat shape without a curved surface or may have a curved surface. The reflection film may have a concave or convex shape as a whole so as to display a projection image in an enlarged or reduced manner.

Laminated Glass

The windshield glass may have a configuration of laminated glass. The windshield glass according to an embodiment of the present invention is a laminated glass and has the above-described reflection film according to an embodiment of the present invention between a first glass plate and a second glass plate.

The windshield glass may have a configuration in which a reflection film is disposed between the first glass plate and the second glass plate. However, the windshield glass preferably has a configuration in which an intermediate film (intermediate film sheet) is disposed between the first glass plate and the reflection film and/or between the reflection film and the second glass plate.

In the windshield glass, for example, the first glass plate is disposed on the side (the outer side of the vehicle) opposite to the visual side of a screen image in the HUD, and the second glass plate is disposed on the visual side (the inner side of the vehicle). In the windshield glass according to an embodiment of the present invention, the terms "first" and "second" in the first glass plate and the second glass plate have no technical meaning and are provided for convenience in order to distinguish the two glass plates. Therefore, the first glass plate may be disposed on the inner side of the vehicle and the second glass plate may be disposed on the outer side of the vehicle.

The glass plate such as the first glass plate or the second glass plate may be a glass plate typically used for windshield glasses. For example, a glass plate having a visible light transmittance of 80% or less, for example, 73% or 76%, such as a green glass having good heat-shielding properties may be used. Even when such a glass plate having a low visible light transmittance is used, a windshield glass having a visible light transmittance of 70% or more even at a position of the reflection film can be produced by using the reflection film according to an embodiment of the present invention.

When the first glass plate and the second glass plate are curved glasses, the linearly polarized light reflection layer, the polarization converting layer, and a first curved glass are preferably laminated in this order on the convex surface of a second curved glass present on the inner side of the vehicle.

The thickness of the glass plate is not particularly limited, and may be about 0.5 to 5.0 mm and is preferably 1.0 to 3.0 mm and more preferably 2.0 to 2.3 mm. The materials and thicknesses of the first glass plate and the second glass plate may be the same or different.

The windshield glass having a configuration of laminated glass can be produced by a publicly known method for producing a laminated glass.

In general, the windshield glass can be produced by sandwiching an intermediate film for laminated glass between two glass plates, then repeatedly performing heat treatment and pressure treatment (e.g., treatment using a rubber roller) several times, and finally performing heat treatment under pressure conditions using an autoclave or the like.

For example, the windshield glass having a configuration of a laminated glass having a reflection film and an intermediate film may be produced by forming a reflection film on a surface of a glass plate and then performing the above-described method for producing a laminated glass or may be produced by the above-described method for producing a laminated glass using an intermediate film for a laminated glass including the above-described reflection film.

When the reflection film is formed on a surface of a glass plate, the glass plate on which the reflection film is to be disposed may be the first glass plate or the second glass plate. At this time, the reflection film is bonded to the glass plate using, for example, an adhesive agent.

Intermediate Film

The intermediate film (intermediate film sheet) may be any publicly known intermediate film used as an intermediate film (intermediate layer) in laminated glasses. The intermediate film may be, for example, a resin film including a resin selected from the group consisting of polyvinyl butyral (PVB), ethylene-vinyl acetate copolymers, and chlorine-containing resins. The above resin is preferably a main component of the intermediate film. The main component refers to a component having a content of 50 mass % or more in the intermediate film.

Among the above resins, polyvinyl butyral and an ethylene-vinyl acetate copolymer are preferably used, and polyvinyl butyral is more preferably used. The resin is preferably a synthetic resin.

The polyvinyl butyral can be obtained by acetalizing polyvinyl alcohol with butyraldehyde. The lower limit of the degree of acetalization of polyvinyl butyral is preferably 40% and more preferably 60%. The upper limit of the degree of acetalization of polyvinyl butyral is preferably 85% and more preferably 75%.

The polyvinyl alcohol is normally obtained by saponifying polyvinyl acetate, and a polyvinyl alcohol having a degree of saponification of 80 to 99.8 mol % is generally used.

The lower limit of the degree of polymerization of the polyvinyl alcohol is preferably 200 and the upper limit of the degree of polymerization is preferably 3000. When the degree of polymerization of the polyvinyl alcohol is 200 or more, the penetration resistance of a laminated glass to be obtained does not readily deteriorate. When the degree of polymerization is 3000 or less, good moldability of a resin film is achieved and the stiffness of the resin film does not excessively increase, which provides good workability. The lower limit of the degree of polymerization is more preferably 500, and the upper limit of the degree of polymerization is more preferably 2000.

Intermediate Film Including Reflection Film

An intermediate film for a laminated glass including a reflection film can be formed by bonding a reflection film to a surface of the above-described intermediate film. Alternatively, the intermediate film for a laminated glass including a reflection film can be formed by sandwiching a reflection film between two of the above-described intermediate films. The two intermediate films may be the same or different, but are preferably the same.

The reflection film and the intermediate films can be bonded to each other by a publicly known bonding method, and laminate treatment is preferably employed. The laminate treatment is preferably performed under certain heating and pressure conditions to prevent the separation between the laminated body and the intermediate films after the treatment.

To stably perform the laminate treatment, the film surface temperature of the intermediate film on the side to which the intermediate film is bonded is preferably 50 to 130° C. and more preferably 70 to 100° C.

Pressure is preferably applied during the laminate treatment. The pressure conditions are not limited, and are preferably less than 2.0 kg/cm$^2$ (less than 196 kPa), more preferably 0.5 to 1.8 kg/cm$^2$ (49 to 176 kPa), and further preferably 0.5 to 1.5 kg/cm$^2$ (49 to 147 kPa).

In the case where the reflection film has a support, the support may be peeled off during the laminate treatment, immediately after the laminate treatment, or immediately before the laminate treatment. That is, the reflection film bonded to the intermediate film obtained after the laminate treatment does not necessarily include a support.

For example, a method for producing an intermediate film including a reflection film includes
(1) a first step of bonding a reflection film to a surface of a first intermediate film to obtain a first laminated body, and (2) a second step of bonding a second intermediate film to a surface of the reflection film in the first laminated body, the surface being opposite to the surface to which the first intermediate film is bonded.

For example, in the first step, the reflection film and the first intermediate film are bonded to each other while the support and the first intermediate film do not face each other. Subsequently, the support is peeled off from the reflection film. In the second step, a second intermediate film is bonded to the surface from which the support has been peeled off. Thus, an intermediate film including a reflection film having no support can be produced. By using the intermediate film including a reflection film, a laminated glass in which the reflection film has no support can be easily produced.

To stably peel off the support without damage or the like, the temperature of the support at which the support is peeled off from the reflection film is preferably 40° C. or higher and more preferably 40 to 60° C.

Head-Up Display System (HUD)

The windshield glass can be used as a constituent member of the HUD. The HUD preferably includes a projector.

Projector

The "projector" is an "apparatus that projects light or a screen image", includes a "device that projects a drawn screen image", and emits projection light that carries a screen image to be displayed. In the HUD according to an embodiment of the present invention, the projector emits p-polarized projection light.

In the HUD, it is sufficient that the projector is disposed so that p-polarized projection light that carries a screen image to be displayed is allowed to enter the reflection film in the windshield glass at an oblique incidence angle.

In the HUD, the projector preferably includes a drawing device and preferably displays, as a virtual image by reflection, a screen image (real image) drawn on a small intermediate image screen using a combiner.

The projector may be a publicly known projector used for HUDs as long as the projector can emit p-polarized projection light. The projector is preferably a projector in which the imaging distance of the virtual image, that is, the imaging position of the virtual image is changeable.

Examples of the method for changing the imaging distance of a virtual image in a projector include a method in which a surface (screen) on which a screen image is generated is moved (refer to JP2017-21302A), a method in which a plurality of optical paths having different optical path lengths are changed (refer to WO2015/190157A), a method in which the optical path length is changed by inserting and/or moving mirrors, a method in which the focal length is changed by using a compound lens as an imaging lens, a method in which a projector 22 is moved, a method in which a plurality of projectors having different imaging distances of virtual images are changed and used, and a method in which a variable-focal-length lens is used (refer to WO2010/116912A).

The projector may be a projector in which the imaging distance of a virtual image is continuously changeable or a projector in which the imaging distance of a virtual image can be changed at two or more points.

Herein, the imaging distances of at least two virtual images among virtual images of projection light from the projector are preferably different from each other by 1 m or more. Therefore, when the imaging distance of a virtual image can be continuously changed in the projector, the imaging distance of a virtual image is preferably changeable by 1 m or more. Such a projector is preferably used because the projector can appropriately handle the case where the distance of line of sight of a driver is considerably different between driving at a normal speed on the general road and driving at a high speed on the expressway.

Drawing Device

The drawing device may be a device that displays a screen image by itself or may be a device that emits light capable of drawing a screen image.

In the drawing device, it is sufficient that light from a light source is controlled by a drawing method such as use of a light modulator, laser intensity modulation means, or optical deflection means for drawing. The drawing device refers to a device that includes a light source and further includes, for example, a light modulator, laser intensity modulation means, or optical deflection means for drawing in accordance with the drawing method.

Light Source

The light source is not limited, and may be a publicly known light source used in projectors, drawing devices, displays, and the like, such as a light emitting diode (LED), an organic light emitting diode (OLED), a discharge tube, or a laser light source.

Among them, an LED and a discharge tube are preferred because they are suitable for a light source of a drawing device that emits linearly polarized light. In particular, an LED is preferred. Since the emission wavelength of LEDs is not continuous in the visible light range, LEDs are suitable for combination with a combiner in which a linearly polarized light reflection layer that exhibits selective reflection in a particular wavelength range is used.

Drawing Method

The drawing method is not particularly limited, and can be selected in accordance with the light source used or the like.

Examples of the drawing method include use of a vacuum fluorescent display, an LCD (liquid crystal display) method that uses liquid crystal, an LCOS (liquid crystal on silicon) method, a DLP (registered trademark) (digital light processing) method, and a scanning method that uses laser. The drawing method may be use of a vacuum fluorescent display integrated with a light source. The drawing method is preferably an LCD method.

In the LCD method and the LCOS method, light beams of different colors are modulated and multiplexed in a light modulator, and light is emitted from a projection lens.

The DLP method is employed in a displaying system that uses a DMD (digital micromirror device). Drawing is performed while micromirrors corresponding to pixels are arranged, and light is emitted from a projection lens.

The scanning method is a method in which a screen is scanned with light beams and imaging is performed by using an afterimage effect of eyes (refer to, for example, the descriptions in JP1995-270711A (JP-H07-270711A) and JP2013-228674A). In the scanning method that uses laser, laser beams of different colors (e.g., red beam, green beam, and blue beam) subjected to intensity modulation are bundled into a single light beam with, for example, a multiplexing optical system or a condensing lens. Scanning with the light beam is performed by optical deflection means to perform drawing on an intermediate image screen described later.

In the scanning method, the intensity modulation of laser beams of different colors (e.g., red beam, green beam, and blue beam) may be directly performed by changing the intensity of a light source or may be performed using an external modulator. The optical deflection means is, for example, a galvanometer mirror, a combination of a galvanometer mirror and a polygon mirror, and a MEMS (microelectro-mechanical system) and is preferably a MEMS. The scanning method is, for example, a random scanning method or a raster scanning method and is preferably a raster scanning method. In the raster scanning method, for example, the laser beam can be moved in a horizontal direction using a resonance frequency and in a vertical direction using a saw-tooth wave. Since the scanning method does not require a projection lens, the size of the device is easily reduced.

The light emitted from the drawing device may be linearly polarized light or natural light (unpolarized light).

In the drawing device that uses an LCD or LCOS method as the drawing method and the drawing device that uses a laser light source, the emitted light is essentially linearly polarized light. In the case where the light emitted from the drawing device is linearly polarized light and contains light beams having plural wavelengths (colors), the polarization directions (transmission axis directions) of the light beams having plural wavelengths are preferably the same. It has been known that some commercially available drawing devices have varying polarization directions in the wavelength ranges of emitted red, green, and blue light beams (refer to JP2000-221449A). Specifically, it has been known as an example that the polarization direction of green beams is orthogonal to the polarization direction of red beams and the polarization direction of blue beams.

In the HUD according to an embodiment of the present invention, the projection light emitted from the projector is p-polarized light as described above.

Intermediate Image Screen

As described above, the drawing device may be a device that uses an intermediate image screen. The "intermediate image screen" is a screen on which a screen image is drawn. That is, for example, when light emitted from the drawing device is not yet visible as a screen image, the drawing device forms a visible screen image on the intermediate image screen from the light. The screen image drawn on the intermediate image screen may be projected on the combiner using light that passes through the intermediate image screen or using light reflected by the intermediate image screen.

Examples of the intermediate image screen include scattering films, microlens arrays, and rear-projection screens. For example, in the case where the intermediate image screen is made of a plastic material, if the intermediate image screen exhibits birefringence, the polarization plane and light intensity of polarized light that enters the intermediate image screen are disturbed, which easily causes color unevenness or the like in the combiner (reflection film). However, the color unevenness can be suppressed by using a retardation film having a particular phase difference.

The intermediate image screen preferably has a function of transmitting incident light beams while diverging the incident light beams. This is because the projection image can be displayed in an enlarged view. Such an intermediate image screen is, for example, a screen constituted by a microlens array. The microlens array used in an HUD is described in, for example, JP2012-226303A, JP2010-145745A, and JP2007-523369A.

The projector may include, for example, a reflecting mirror that adjusts the optical path of projection light formed by the drawing device.

For HUDs in which a windshield glass is used as a reflection film, refer to, for example, JP1990-141720A (JP-H02-141720A), JP1998-96874A (JP-H10-96874A), JP2003-98470A, U.S. Pat. No. 5,013,134A, and JP2006-512622A.

The windshield glass is particularly useful for HUDs used in combination with a projector including, as a light source, a laser having a discrete emission wavelength in the visible light range, an LED, an OLED (organic light-emitting diode), or the like. This is because the selective reflection center wavelength of the cholesteric liquid crystal layer can be controlled in accordance with each emission wavelength. The windshield glass can also be used for projection of a display such as an LCD (liquid crystal display) whose light for display is polarized.

Projection Light (Incident Light)

The incident light is preferably caused to enter the reflection film at an oblique incidence angle of 45° to 70° with respect to the normal of the reflection film. The Brewster's angle at an interface between a glass having a refractive index of about 1.51 and air having a refractive index of 1 is about 56°. When p-polarized light is caused to enter the reflection film in the above-described angle range, only a small amount of incident light for displaying a projection image is reflected by the surface of the windshield glass on the visual side relative to the selectively reflecting layer, which allows display of a screen image that is less susceptible to double images.

The above angle is also preferably 50° to 65°. Herein, it is sufficient that the projection image can be observed on the incidence side of projection light at an angle of 45° to 70°, preferably 50° to 65°, symmetrically with respect to the normal of the selectively reflecting layer.

The incident light may enter the windshield glass in any direction, that is, from the top, bottom, left, and right of the windshield glass, and it is sufficient that the direction is determined in accordance with the visual direction. For example, the incident light preferably enters the windshield glass at the above-described oblique incidence angle from the bottom during operation.

It is sufficient that the reflection film of the windshield glass is disposed so as to reflect incident p-polarized light.

As described above, projection light used when a projection image is displayed on the HUD according to an embodiment of the present invention is p-polarized light that oscillates in a direction parallel to the incidence plane.

When light emitted from the projector is not linearly polarized light, the light may be converted into p-polarized light by disposing a linearly polarizing film (polarizer) on the side through which light is emitted from the projector or by a publicly known method that uses, for example, a linearly polarizing film in an optical path from the projector to the windshield glass. In this case, a member that converts projection light that is not linearly polarized light into p-polarized light is also regarded as a member constituting the projector in the HUD according to an embodiment of the present invention.

As described above, in the projector in which the polarization direction varies in the wavelength ranges of red, green, and blue light beams emitted, the incident light is preferably p-polarized light in the wavelength ranges of all colors by wavelength-selectively controlling the polarization direction.

As described above, the HUD (projector) may be a projection system in which the imaging position of a virtual image is changeable. When the imaging position of a virtual image is changeable, a driver can visually recognize the virtual image with more comfort and convenience.

The imaging position of a virtual image is a position at which a driver of a vehicle can visually recognize the virtual image, such as a position 1000 mm or more ahead of the windshield glass from the driver.

Herein, if the glass is nonuniform (wedge shape) in the reflection film as described in JP2011-505330A, the angle of the wedge shape needs to be changed when the imaging position of a virtual image is changed. Therefore, as described in, for example, JP2017-15902A, the angle of the wedge shape needs to be partly changed to change the projection position, thereby pretendedly addressing the change in the imaging position of a virtual image.

However, in the HUD according to an embodiment of the present invention that uses the windshield glass according to an embodiment of the present invention and that uses p-polarized light as described above, the use of a wedge-shaped glass is not necessary, and the thickness of the glass can be made uniform in the reflection film. Therefore, a projection system in which the imaging position of a virtual image is changeable can be suitably employed.

Next, the HUD will be more specifically described with reference to FIG. 4 and FIG. 5.

Figure 4:
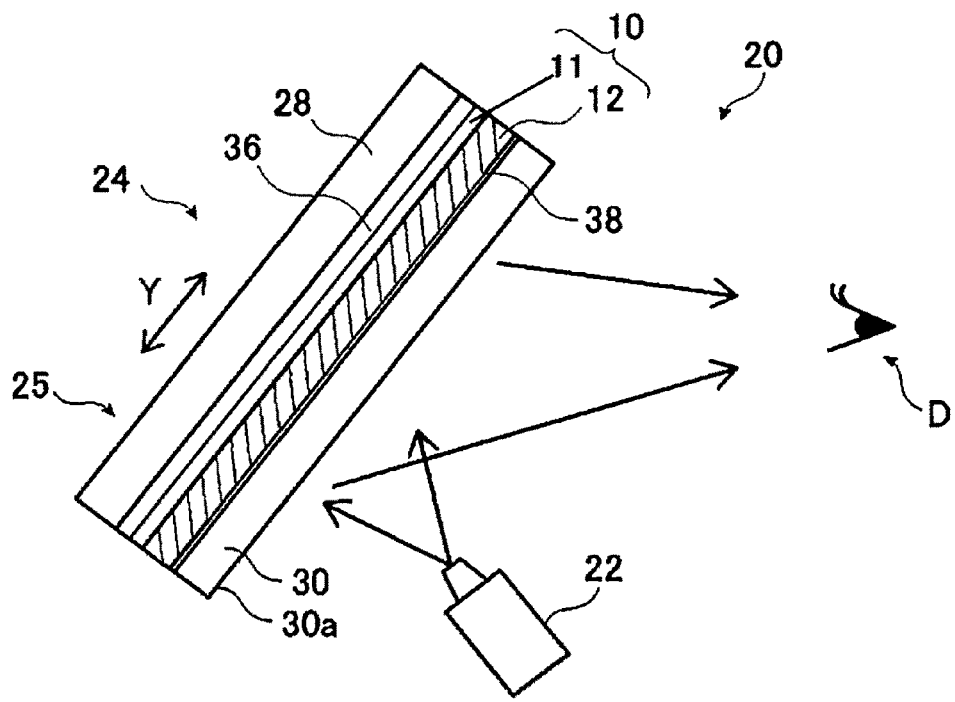
FIG. 4 is a schematic view illustrating an example of a head-up display having the reflection film according to an embodiment of the present invention.

FIG. 4 is a schematic view illustrating an example of a head-up display having the reflection film according to an embodiment of the present invention. FIG. 5 is a schematic view illustrating an example of a windshield glass having the reflection film according to an embodiment of the present invention.

The HUD 20 has a projector 22 and a windshield glass 24, and is used for, for example, vehicles such as passenger cars. Each of the constituent elements of the HUD 20 has been described above.

Figure 5:
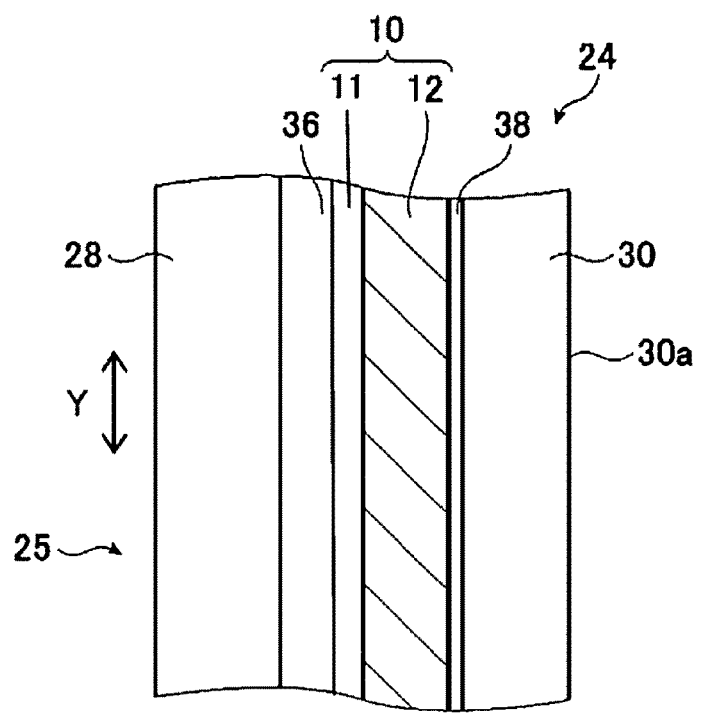
FIG. 5 is a schematic view illustrating an example of a windshield glass having the reflection film according to an embodiment of the present invention.

In the HUD 20, as conceptually illustrated in FIG. 5, the windshield glass 24 has a first glass plate 28 serving as the first glass plate, a second glass plate 30 serving as the second glass plate, a reflection film 10, an intermediate film 36, and an adhesive layer 38.

The reflection film 10 is the reflection film 10 illustrated in FIG. 1 and has a selectively reflecting layer in which optically anisotropic layers and isotropic layers are alternately laminated. In the HUD 20, the windshield glass 24 and the reflection film 10 illustrated in FIG. 2 are disposed so that the left and right direction of the windshield glass 24 matches the transmission axis of the reflection film 10. In the windshield glass (HUD) according to an embodiment of the present invention, the reflection film may have a support.

The up and down direction Y of the windshield glass 24 is a direction corresponding to the top and bottom direction of a vehicle or the like including the windshield glass 24 disposed therein, and is defined as a direction in which the ground side is the lower side and the side opposite to the ground side is the upper side. In the case where the windshield glass 24 is disposed in a vehicle or the like, the windshield glass 24 is sometimes disposed in an inclined manner for the sake of convenience of structure or design. In this case, the up and down direction Y corresponds to a direction along a surface 25 of the windshield glass 24. The surface 25 is an outer surface of the vehicle.

The projector 22 has been described above. The projector 22 may be a publicly known projector used for HUDs as long as the projector can emit p-polarized projection light that carries a screen image to be displayed. The projector 22 is preferably a projector in which the imaging distance of a virtual image, that is, the imaging position of a virtual image is changeable.

In the HUD 20, the projector 22 irradiates the windshield glass 24 (second glass plate 30) with p-polarized projection light. When the projection light with which the windshield glass 24 is irradiated by the projector 22 is p-polarized light, the reflection of the projection light by the second glass plate 30 and the first glass plate 28 of the windshield glass 24 can be considerably reduced, which can suppress inconvenience such as observation of double images.

The projector 22 preferably irradiates the windshield glass 24 with p-polarized projection light at a Brewster's angle. This eliminates the reflection of projection light at the second glass plate 30 and the first glass plate 28, which allows display of a clearer screen image.

The windshield glass 24 is a so-called laminated glass and has the intermediate film 36, the reflection film 10, and the adhesive layer 38 between the first glass plate 28 and the second glass plate 30.

Projection light emitted from the projector 22 enters the second glass plate 30 through the surface 30a of the second glass plate 30. The reflection film 10 reflects p-polarized light, and the direction of linearly polarized light reflected by the reflection film is set so that the reflection film reflects p-polarized light as described above.

The reflection film 10 is bonded to the first glass plate 28 using the intermediate film 36 and to the second glass plate 30 using the adhesive layer 38 so as to be sandwiched between the first glass plate 28 and the second glass plate 30.

In the present invention, preferably, the first glass plate 28 and second glass plate 30 of the windshield glass 24 are basically disposed in parallel.

The first glass plate 28 and the second glass plate 30 are each a publicly known glass (glass plate) used for windshields of vehicles or the like. Therefore, for example, the material, the thickness, and the shape may be the same as those of publicly known glasses used for windshields. The first glass plate 28 and the second glass plate 30 illustrated in FIG. 5 each have a plate-like shape, but the shape is not limited thereto. They may partly have a curved surface or may entirely have a curved surface.

The intermediate film 36 is provided to prevent the glass from flying into a car and scattering inside the car when an accident occurs. The intermediate film 36 is also provided to bond the reflection film 10 and the first glass plate 28 to each other. The intermediate film 36 may be a publicly known intermediate film (intermediate layer) used for windshields formed of laminated glass. Examples of the material for the intermediate film 36 include polyvinyl butyral (PVB), ethylene-vinyl acetate copolymer, chlorine-containing resin, and polyurethane.

The thickness of the intermediate film 36 is not limited, and may be set to the same thickness as publicly known intermediate films for windshield glasses in accordance with, for example, the material for the intermediate film 36.

The adhesive layer 38 is a layer formed of, for example, a coating-type adhesive agent. The reflection film 10 is bonded to the second glass plate 30 using the adhesive layer 38. In the windshield glass according to an embodiment of the present invention, the reflection film 10 may be bonded to the second glass plate 30 using an intermediate film instead of the adhesive layer 38. When the reflection film 10 is smaller than the intermediate film 36 used to bond the first glass plate 28 and the reflection film 10, the reflection film 10 may be bonded to the second glass plate 30 using the intermediate film 36.

The adhesive layer 38 is not limited, and may be formed of publicly known various coating-type adhesive agents as long as transparency required as the windshield glass 24 can be ensured and the reflection film 10 and the glass can be bonded to each other with a necessary adhesive strength. The adhesive layer 38 may be formed of the same material as the intermediate film 36, such as PVB. Instead, the adhesive layer 38 may be formed of, for example, an acrylate-based adhesive agent. The adhesive layer 38 may be formed of the same material as the above-described adhesive layer as described below.

The adhesive layer 38 may be formed of an adhesive agent in the same manner as the above-described adhesive layer.

From the viewpoint of the type of setting, adhesive agents are classified into hot-melt adhesive agents, thermosetting adhesive agents, photosetting adhesive agents, reaction-setting adhesive agents, and pressure-sensitive adhesive agents requiring no setting. Examples of usable materials for these adhesive agents include compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds.

From the viewpoint of workability and productivity, the type of setting is preferably photosetting. From the viewpoint of optical transparency and heat resistance, the material for use is preferably, for example, an acrylate compound, a urethane acrylate compound, or an epoxy acrylate compound.

The adhesive layer 38 may be formed using a high-transparency adhesive transfer tape (OCA tape). The high-transparency adhesive transfer tape may be a commercially available tape for screen image display devices, in particular, a commercially available tape for a surface of a screen image display unit of a screen image display device. Examples of the commercially available tape include an adhesive sheet (e.g., PD-S1) manufactured by PANAC Co., Ltd. and an MHM adhesive sheet manufactured by Nichieikako Co., Ltd.

The thickness of the adhesive layer 38 is also not limited. Therefore, it is sufficient that the thickness is appropriately set in accordance with the material for the adhesive layer 38 so as to provide a sufficient bonding strength.

Herein, if the adhesive layer 38 is excessively thick, the reflection film 10 sometimes cannot be bonded to the first glass plate 28 or the second glass plate 30 while the planarity is sufficiently maintained. In consideration of this point, the thickness of the adhesive layer 38 is preferably 0.1 to 800 µm and more preferably 0.5 to 400 µm.

For the windshield glass 24, the adhesive layer 38 is disposed between the reflection film 10 and the second glass plate 30, and the reflection film 10 and the first glass plate 28 are bonded to each other using the intermediate film 36, but the configuration of the windshield glass 24 is not limited thereto. That is, an adhesive layer may be disposed between the reflection film 10 and the first glass plate 28, and an intermediate film may be disposed between the reflection film 10 and the second glass plate 30.

The windshield glass 24 may have a configuration in which the windshield glass 24 does not have the intermediate film 36, and the reflection film 10 and the first glass plate 28 may be bonded to each other using the adhesive layer 38 and the reflection film 10 and the second glass plate 30 may be bonded to each other using the adhesive layer 38.

In the HUD 20, the windshield glass 24 has a configuration in which the reflection film 10 is disposed between the first glass plate 28 and the second glass plate 30, the reflection film 10 is bonded to the second glass plate 30 using the adhesive layer 38, and the reflection film 10 is bonded to the first glass plate 28 using the intermediate film 36.

As illustrated in FIG. 4, in the HUD 20, an observer of a screen image, that is, a driver D observes a virtual image formed through projection by the projector 22 and reflection by the windshield glass 24.

In a typical HUD, a projection image of a projector is reflected by a windshield glass, and the resulting reflected light is observed. Herein, a typical windshield glass is a laminated glass and has two glasses on the inner surface side and the outer surface side. Therefore, such an HUD poses a problem in that a driver observes double images through reflected light from the two glasses.

To address this problem, in a typical HUD, the section of the windshield glass (intermediate film) has a wedge shape so that the reflection at the inner-side glass and the reflection at the outer-side glass overlap each other, thus preventing observation of double images.

However, as described above, in a wedge-shaped windshield glass, if the imaging distance of a virtual image is changed to handle the difference in line of sight of a driver between normal driving with a short line of sight and high-speed driving with a long line of sight, the angle of the wedge of the windshield glass becomes inappropriate. Consequently, the driver observes a double image.

In contrast, in the HUD 20 according to an embodiment of the present invention, the projector 22 projects p-polarized light, the windshield glass 24 has the reflection film 10 that reflects the p-polarized light between the first glass plate 28 and the second glass plate 30, and the driver D observes the light reflected by the reflection film 10. In such a configuration, the reflection of projection light of the projector 22 at the reflection film 10 is basically dominant, and thus formation of double images is basically less likely to occur.

Therefore, in the HUD 20 that uses the reflection film 10 according to an embodiment of the present invention for the windshield glass 24, the section of the windshield glass 24 (intermediate film 36) does not necessarily have a wedge shape. Therefore, even if the imaging distance of a virtual image is changed, double images are not formed.

The present invention basically has the above configuration. Although the reflection film, the windshield glass, and the head-up display system (HUD) according to embodiments of the present invention have been described in detail above, the present invention is not limited to the above embodiments, and various improvements or changes may be made without departing from the spirit of the present invention.

EXAMPLES

Hereafter, the features of the present invention will be further specifically described based on Examples. Materials, reagents, amounts and percentages of substances, operations, and the like used in Examples below can be appropriately changed without departing from the spirit of the present invention. Therefore, the scope of the present invention is not limited to Examples below.

Production of Linearly Polarized Light Reflection Layer

A linearly polarized light reflection layer was produced as follows by a method described in JP1997-506837A (JP-H09-506837A).

In a standard polyester resin synthesis kettle, 2,6-polyethylene naphthalate (PEN) and a copolyester (coPEN) of naphthalate 70/terephthalate 30 were synthesized using ethylene glycol as a diol. Monolayer films of PEN and coPEN were extruded, then stretched at a stretching ratio of 5:1 at about 150° C., and heat-treated at about 230° C. for 30 seconds. It was confirmed that the refractive index of PEN associated with the slow axis (alignment axis) was about 1.86, the refractive index associated with the transverse axis was 1.64, and the refractive index of the coPEN film was about 1.64.

Subsequently, PEN and coPEN were simultaneously extruded using a 25-slot feed block equipped with a standard extrusion die to form a layer having four alternating layers of PEN and coPEN having film thicknesses shown in (1) in Table 1 below. Furthermore, by repeating the same procedure, four alternating layers of PEN and coPEN having film thicknesses shown in (2) in Table 1 and eight alternating layers of PEN and coPEN having film thicknesses shown in (3) in Table 1 were sequentially formed to produce a laminated body having 16 layers in total. A coPEN film having a film thickness of 10 μm was further extruded, and the resulting laminated body was stretched at about 150° C. at a stretching ratio of 5:1.

TABLE 1

|  |  | (1) | (2) | (3) |
|---|---|---|---|---|
| PEN | Film thickness | 73.98 nm | 87.4 nm | 107.5 nm |
| coPEN | Film thickness | 83.8 nm | 99.1 nm | 122.0 nm |
|  | Number of layers | 4 | 4 | 8 |

Subsequently, the stretched laminated body was heat-treated at about 230° C. for 30 seconds in an air oven to produce a linearly polarized light reflection layer. The produced linearly polarized light reflection layer had a thickness of about 12 μm. When the reflection spectrum of the linearly polarized light reflection layer was measured with a spectrophotometer (manufactured by JASCO Corporation, V-670), a broad reflection spectrum having a reflectivity of about 20% in a reflection band of 450 nm to 700 nm was obtained.

Preparation of Coating Liquid

Polarization Converting Layer A-Forming Coating Liquid

The following components were mixed to prepare a polarization converting layer A-forming coating liquid having the following composition.

Mixture 1: 100 parts by mass

Fluorine-based horizontal alignment agent 1 (alignment controlling agent 1): 0.05 parts by mass Fluorine-based horizontal alignment agent 2 (alignment controlling agent 2): 0.01 parts by mass Polymerization initiator IRGACURE OXE01 (manufactured by BASF): 1.0 part by mass Solvent (methyl ethyl ketone): such an amount that the solute concentration was 20 mass %

Mixture 1

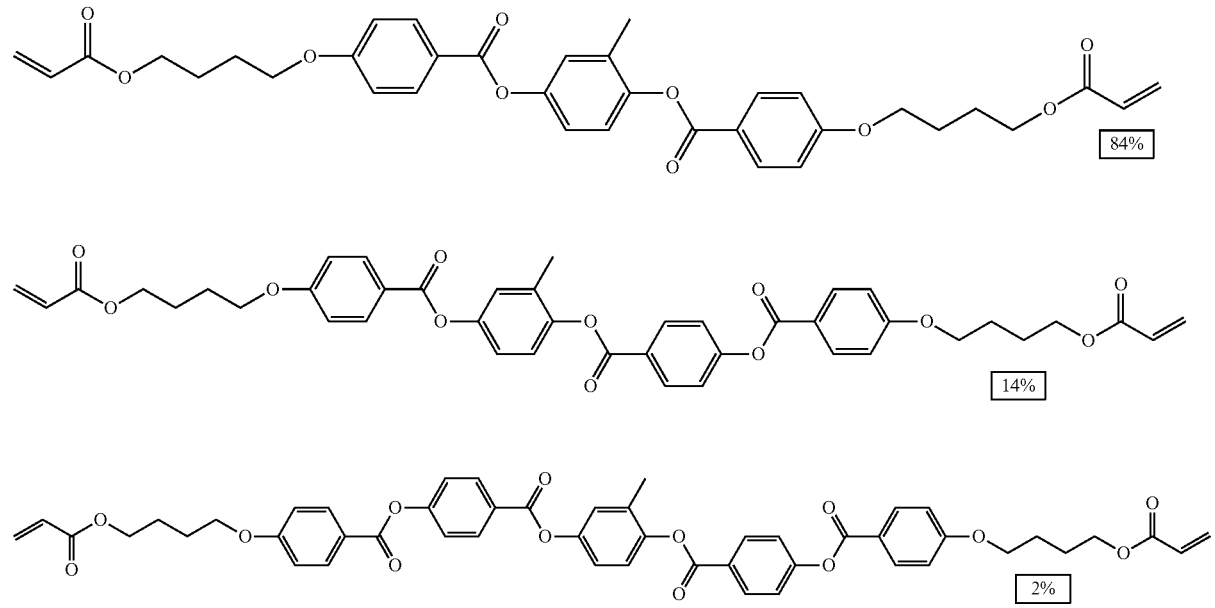

The numerical value is expressed in units of mass %.

Alignment Controlling Agent 1

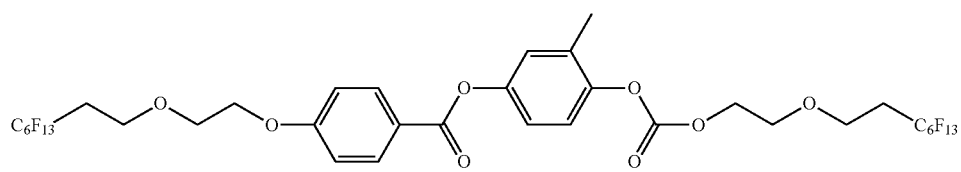

Alignment Controlling Agent 2

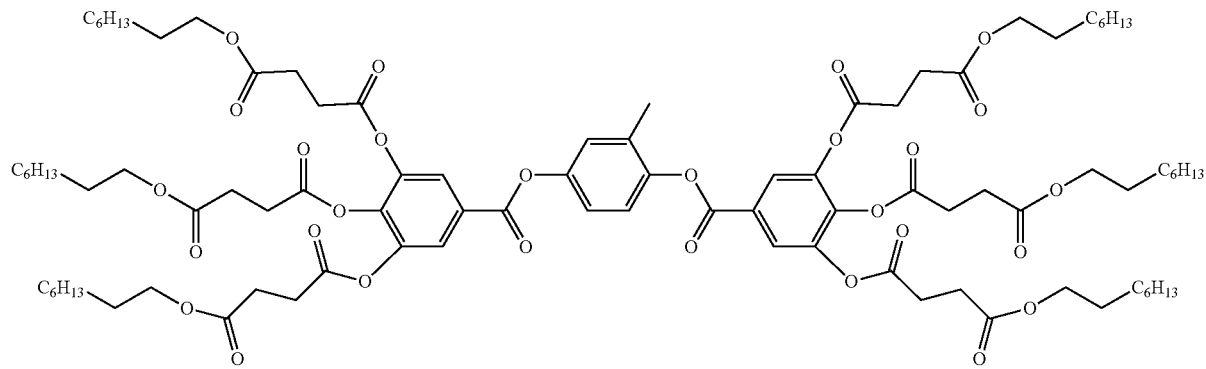

Polarization Converting Layer B-Forming Coating Liquid

The following components were mixed to prepare a polarization converting layer B-forming coating liquid having the following composition.

Mixture 1: 100 parts by mass
Fluorine-based horizontal alignment agent 1 (alignment controlling agent 1): 0.05 parts by mass
Fluorine-based horizontal alignment agent 2 (alignment controlling agent 2): 0.02 parts by mass
Dextrorotatory chiral agent LC756 (manufactured by BASF): adjusted in accordance with the reflection wavelength corresponding to the target number of pitches and the target film thickness
Polymerization initiator IRGACURE OXE01 (manufactured by BASF): 1.0 part by mass
Solvent (methyl ethyl ketone): such an amount that the solute concentration was 20 mass %

The content of the dextrorotatory chiral agent LC756 in the polarization converting layer B-forming coating liquid was adjusted to prepare a polarization converting layer-forming coating liquid so that a cholesteric liquid crystal layer to be obtained had a desired selective reflection center wavelength $\lambda$. The selective reflection center wavelength $\lambda$ was determined by forming a single cholesteric liquid crystal layer having a film thickness of 3 μm on a temporary support and performing measurement with FTIR (manufactured by PerkinElmer, Inc., Spectrum Two).

The film thickness d of the helical structure can be expressed by "the pitch P of the helical structure×the number of pitches". As described above, the pitch P of the helical structure refers to a length of one pitch in the helical structure, and 360° rotation of a helically aligned liquid crystal compound corresponds to one pitch. In the cholesteric liquid crystal layer, the selective reflection center wavelength $\lambda$ matches "length P of one pitch×in-plane average refractive index n" ($\lambda = P \times n$). Therefore, the pitch P is "selective reflection center wavelength $\lambda$/in-plane average refractive index n" ($P = \lambda/n$).

Thus, a polarization converting layer B-forming coating liquid was prepared so that a cholesteric liquid crystal layer to be obtained had a desired selective reflection center wavelength $\lambda$. In the formation of a polarization converting layer B described later, the polarization converting layer B-forming coating liquid was applied with a desired film thickness to form a polarization converting layer B, thereby determining the number of pitches.

In Example 9, the number of pitches of the helical structure of the polarization converting layer B was adjusted to 0.25, the film thickness was adjusted to 1.1 μm, and the selective reflection center wavelength $\lambda$ was adjusted to 6864 nm.

Example 1

Using the linearly polarized light reflection layer as a support, the following alignment film was formed on the support, and then the polarization converting layer A was formed.

Formation of Alignment Film

An alignment film-forming coating liquid having the following composition was applied onto the linearly polarized light reflection layer using a wire bar coater in an amount of 24 mL/m² and dried with hot air at 100° C. for 120 seconds.

Composition of Alignment Film-Forming Coating Liquid
Modified polyvinyl alcohol shown below: 28 parts by mass
Citric acid ester (AS3, manufactured by Sankyo Chemical Co., Ltd.): 1.2 parts by mass
Photopolymerization initiator (Irgacure 2959, manufactured by BASF): 0.84 parts by mass
Glutaraldehyde: 2.8 parts by mass
Water: 699 parts by mass
Methanol: 226 parts by mass Modified Polyvinyl Alcohol

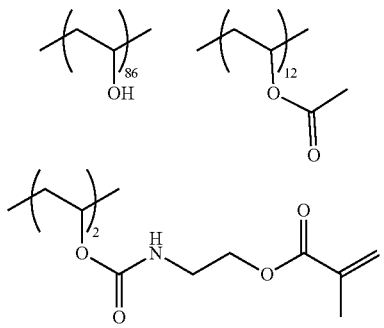

The formed film was subjected to rubbing treatment (rayon cloth, pressure: 0.1 kgf (0.98 N), rotation speed: 1000 rpm (revolutions per minute), transport speed: 10 m/min, number of times: moved back and force once) in a direction (refer to FIG. 2) 30° rotated clockwise with respect to the long-side direction of the support. Thus, an alignment film was formed.

Production of Polarization Converting Layer A

The polarization converting layer A-forming coating liquid was applied onto a surface of the alignment film on the support using a wire bar and then dried.

Subsequently, the resulting product was placed on a hotplate at 50° C. and irradiated with ultraviolet rays for 6 seconds using an electrodeless lamp "D-bulb" (60 mW/cm$^2$) manufactured by Fusion UV Systems Co., Ltd. in an environment with an oxygen concentration of 1000 ppm or less to fix the liquid crystal phase. Thus, a retardation layer (polarization converting layer A) whose thickness was adjusted so as to obtain a desired front retardation was formed. Thus, a reflection film having the linearly polarized light reflection layer and the polarization converting layer A was produced.

The front retardation of the produced retardation layer measured with an AxoScan was 100 nm (Example 1).

Comparative Example 1

A reflection film was produced in the same manner as in Example 1, except that the polarization converting layer A was not formed. That is, the linearly polarized light reflection layer alone was used as a reflection film.

Examples 2 to 8 and Comparative Examples 2 and 3

Reflection films were produced in the same manner as in Example 1, except that the front retardation of the polarization converting layer A and the angle between the slow axis direction and the transmission axis direction of the linearly polarized light reflection layer were changed to those shown in Table 2. The front retardation was adjusted by changing the film thickness of the polarization converting layer from that in Example 1.

Example 9

A polarization converting layer B was formed using, as a support, the linearly polarized light reflection layer on which the alignment film was formed.

One surface of the support was subjected to rubbing treatment (rayon cloth, pressure: 0.1 kgf (0.98 N), rotation speed: 1000 rpm (revolutions per minute), transport speed: 10 m/min, number of times: moved back and force once) in a long-side direction of the support.

The polarization converting layer B-forming coating liquid was applied onto the rubbed surface of the support using a wire bar and then dried. Subsequently, the resulting product was placed on a hotplate at 50° C. and irradiated with ultraviolet rays for 6 seconds using an electrodeless lamp "D-bulb" (60 mW/cm$^2$) manufactured by Fusion UV Systems Co., Ltd. in an environment with an oxygen concentration of 1000 ppm or less to fix the liquid crystal phase. Thus, a polarization converting layer B whose film thickness was adjusted to a desired film thickness was formed. Thus, a reflection film having the linearly polarized light reflection layer and the polarization converting layer B was produced.

Comparative Examples 4 to 6

Polarization converting layers B were formed and reflection films were produced in the same manner as in Example 9, except that the amount of the chiral agent in the polarization converting layer B-forming coating liquid and the coating thickness were appropriately changed to obtain the number of pitches and the film thickness shown in Table 2.

Production of Laminated Glass

A laminated glass having each of the above-produced reflection films was produced as follows.

The obtained reflection film was cut into a size with a short-side (vertical) 250 mm×a long-side (horizontal) 280 mm.

A glass plate having a length of 300 mm, a width of 300 mm, and a thickness of 2 mm (manufactured by Central Glass Co., Ltd., FL2, visible light transmittance 90%) was provided.

A PVB film having a thickness of 0.76 mm, cut to the same size as that of the glass plate, and manufactured by Sekisui Chemical Co., Ltd. was disposed on the glass plate as an intermediate film. A sheet-shaped linearly polarized light reflection film was disposed on the intermediate film so that the slow axis direction was in parallel with the vertical direction.

The same intermediate film and glass plate as above were disposed on the linearly polarized light reflection film.

This laminated body was held at 90° C. and 10 kPa (0.1 atmospheres) for one hour and then heated in an autoclave (manufactured by KURIHARA SEISAKUSHO Co., Ltd.) at 115° C. and 1.3 MPa (13 atmospheres) for 20 minutes to remove air bubbles. Thus, a laminated glass was obtained.

Evaluation of Double Images

The p-polarized light reflectivity was measured in the presence or absence of a black PET film by the following method, and the formation of double images was evaluated from the difference in brightness.

Measurement of p-Polarized Light Reflectivity

Here, p-polarized light was caused to enter the laminated glass from the linearly polarized light reflection layer side at 65° with respect to the direction normal to the glass. The reflectivity spectrum of the regularly reflected light (at an angle of 65° symmetrically with respect to the direction normal to the incidence plane) was measured using a spectrophotometer (manufactured by JASCO Corporation, V-670). The long-side direction of the reflection film was made parallel with the transmission axis of p-polarized light entering the spectrophotometer. Furthermore, the glass was rotated 20 degrees clockwise around the transmission axis.

In conformity with JIS R 3106, a projection image reflectivity was calculated by multiplying the reflectivity in the wavelength range of 380 to 780 nm at intervals of 10 nm by a coefficient based on luminosity and an emission spectrum of a D65 light source. The projection image reflectivity was evaluated as brightness.

Subsequently, a black PET film including a light absorber was attached to the back surface of the laminated glass, and the p-polarized light reflectivity was measured. In this measurement, the attachment of the black PET film eliminates the influence of brightness of light (projection image) reflected by the glass surface, and the brightness of light reflected by the reflection film is measured.

From the measurement results, the percentage of the brightness of light (projection image) reflected by the glass surface at which double images were formed was calculated from the following formula, and the evaluation was made on the basis of the following evaluation criteria.

Double image=((brightness−brightness(black *PET* attached))/brightness)×100[%]

Evaluation Criteria of Double Images

AA: 7% or less

A: more than 7% and 10% or less (double images are less visible)

B: more than 10% (double images are visible)

Evaluation of Suitability for Polarizing Sunglasses

Here, s-polarized light was caused to enter the glass surface of the laminated glass opposite to the linearly polarized light reflection layer at 65° with respect to the direction normal to the glass. The transmittance spectrum of p-polarized light of the transmitted light was measured using a spectrophotometer (manufactured by JASCO Corporation, V-670) from the surface of the laminated glass opposite to the incidence surface.

At this time, a linearly polarizing plate was disposed in a light receiving section of the spectrophotometer to make the vertical direction of the windshield glass and the transmission axis of p-polarized light incident on the spectrophotometer parallel to each other. Furthermore, the glass was rotated 20 degrees counterclockwise around the transmission axis.

In conformity with JIS R 3106, a visible light transmittance was calculated by multiplying a coefficient based on luminosity and an emission spectrum of a D65 light source in the wavelength range of 380 to 780 nm at intervals of 10 nm. The suitability for polarizing sunglasses was evaluated. The suitability for polarizing sunglasses was evaluated on the basis of the following evaluation criteria.

Evaluation Criteria of Suitability for Polarizing Sunglasses

AA: less than 2%
A: 2% or more and less than 3%
B: 3% or more and less than 5%
C: 5% or more Table 2 shows the results. In Table 2, the layer in which the helical alignment structure of the liquid crystal compound serving as the polarization converting layer B is fixed is referred to as a twist layer. The value of (1560×y)/x is referred to as a value (iii).

obtained in Examples of the present invention in terms of suitability for polarizing sunglasses.

The comparison of Examples 1 to 8 shows that the front retardation of the retardation layer serving as the polarization converting layer A is preferably 50 nm to 120 nm and the angle β is preferably 20° or less.

The comparison between Example 9 and Comparative Examples 4 to 6 shows that in the case where the polarization converting layer is a layer in which the helical alignment structure of the liquid crystal compound is fixed, formation of double images are suppressed and good suitability for polarizing sunglasses are achieved when the number of pitches x of the helical alignment structure and the film thickness y (unit: μm) of the polarization converting layer satisfy all of the above relational expressions (i) to (iii).

From the above results, the advantageous effects of the present invention are obvious.

The present invention is suitably applicable to, for example, head-up display systems (HUDs) for vehicles.

REFERENCE SIGNS LIST 10 reflection film
11 polarization converting layer
12 linearly polarized light reflection layer
12a optically anisotropic layer
12b isotropic layer
20 head-up display system (HUD)
22 projector
24 windshield glass
25, 30a surface
28 first glass plate
30 second glass plate
36 intermediate film

TABLE 2

|  | Polarization converting layer | | | | | Evaluation | |
| --- | --- | --- | --- | --- | --- | --- | --- |
|  | Retardation layer | | Twist layer | | |  | Suitability |
|  |  |  |  | Film | |  | for |
|  | Type | Front Re nm | Angle β ° | Number of pitches | thickness μm | Value (iii) | Double image | polarizing sunglasses |
| Example 1 | Retardation layer | 100 | −30 | — | — | — | A | A |
| Example 2 | Retardation layer | 120 | 0 | — | — | — | AA | AA |
| Example 3 | Retardation layer | 70 | 0 | — | — | — | AA | AA |
| Example 4 | Retardation layer | 35 | 0 | — | — | — | A | A |
| Example 5 | Retardation layer | 120 | −15 | — | — | — | AA | AA |
| Example 6 | Retardation layer | 120 | −30 | — | — | — | A | A |
| Example 7 | Retardation layer | 137 | 15 | — | — | — | A | A |
| Example 8 | Retardation layer | 180 | 0 | — | — | — | A | A |
| Example 9 | Twist layer | — | — | 0.25 | 1.1 | 6864 | A | A |
| Comparative Example 1 | None | — | — | — | — | — | B | B |
| Comparative Example 2 | Retardation layer | 137 | 45 | — | — | — | B | B |
| Comparative Example 3 | Retardation layer | 270 | 30 | — | — | — | B | B |
| Comparative Example 4 | Twist layer | — | — | 0.795 | 3.5 | 6864 | B | B |
| Comparative Example 5 | Twist layer | — | — | 0.6864 | 1.1 | 2500 | B | B |
| Comparative Example 6 | Twist layer | — | — | 0.0858 | 1.1 | 20000 | B | B |

Table 2 shows that better results are obtained for double images in Examples of the present invention than in Comparative Examples. It is also found that good results are 38 adhesive layer
D driver
Y up and down direction

What is claimed is:

1. A reflection film comprising:
a linearly polarized light reflection layer obtained by laminating optically anisotropic layers and isotropic layers; and
a polarization converting layer,
wherein the polarization converting layer satisfies any of conditions below,
(A) the polarization converting layer is a retardation layer in which a front retardation at a wavelength of 550 nm is 30 nm to 200 nm and an angle between a slow axis direction and a direction of a transmission axis of the linearly polarized light reflection layer is 35° or less, and
(B) the polarization converting layer is a layer in which a helical alignment structure of a liquid crystal compound is fixed, and a number of pitches x in the helical alignment structure and a film thickness y (unit μm) of the polarization converting layer satisfy all relational expressions below, $$0.1 \leq x \leq 1.0 \quad \text{(i)}$$

$$0.5 \leq y \leq 3.0 \quad \text{(ii)}$$

$$3000 \leq (1560xy)/x \leq 50000 \quad \text{(iii)}$$

2. The reflection film according to claim 1,
wherein the polarization converting layer is a retardation layer in which the front retardation at a wavelength of 550 nm is 50 nm to 120 nm and the angle between a slow axis direction and a direction of a transmission axis of the linearly polarized light reflection layer is 20° or less.

3. The reflection film according to claim 2,
wherein a number of the optically anisotropic layers and the isotropic layers laminated in the linearly polarized light reflection layer is 10 to 60.

4. A windshield glass comprising:
the reflection film according to claim 2; and
a first curved glass and a second curved glass that sandwich the reflection film,
wherein the linearly polarized light reflection layer, the polarization converting layer, and the first curved glass are laminated in this order on a convex surface of the second curved glass.

5. A head-up display system comprising:
the windshield glass according to claim 4; and
a projector that emits p-polarized projection image light through the second curved glass of the windshield glass.

6. The reflection film according to claim 1,
wherein a number of the optically anisotropic layers and the isotropic layers laminated in the linearly polarized light reflection layer is 10 to 60.

7. A windshield glass comprising:
the reflection film according to claim 6; and
a first curved glass and a second curved glass that sandwich the reflection film,
wherein the linearly polarized light reflection layer, the polarization converting layer, and the first curved glass are laminated in this order on a convex surface of the second curved glass.

8. A head-up display system comprising:
the windshield glass according to claim 7; and
a projector that emits p-polarized projection image light through the second curved glass of the windshield glass.

9. A windshield glass comprising:
the reflection film according to claim 1; and
a first curved glass and a second curved glass that sandwich the reflection film,
wherein the linearly polarized light reflection layer, the polarization converting layer, and the first curved glass are laminated in this order on a convex surface of the second curved glass.

10. A head-up display system comprising:
the windshield glass according to claim 9; and
a projector that emits p-polarized projection image light through the second curved glass of the windshield glass.

* * * * *